(12) United States Patent
Borole et al.

(10) Patent No.: US 8,352,934 B1
(45) Date of Patent: *Jan. 8, 2013

(54) METHOD AND SYSTEM FOR UPGRADING SOFTWARE OR FIRMWARE BY USING DRAG AND DROP MECHANISM

(75) Inventors: Amol Borole, San Antonio, TX (US); Jean-Francois Vincent, Cupertino, CA (US); Manoj Panda, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 45 days.

This patent is subject to a terminal disclaimer.

(21) Appl. No.: 13/163,034

(22) Filed: Jun. 17, 2011

Related U.S. Application Data

(63) Continuation of application No. 11/238,914, filed on Sep. 29, 2005, now Pat. No. 7,979,854.

(51) Int. Cl.
*G06F 9/445* (2006.01)

(52) U.S. Cl. ........ 717/172; 717/168; 717/174; 717/178; 709/222; 709/224

(58) Field of Classification Search .......... 717/168–178; 709/222, 224
See application file for complete search history.

(56) References Cited

U.S. PATENT DOCUMENTS

| | | | |
|---|---|---|---|
| 5,732,275 A * | 3/1998 | Kullick et al. | 717/170 |
| 5,801,700 A | 9/1998 | Ferguson | |
| 5,953,532 A | 9/1999 | Lochbaum | |
| 6,259,448 B1 | 7/2001 | McNally et al. | |
| 6,360,255 B1 | 3/2002 | McCormack et al. | |
| 6,453,468 B1 | 9/2002 | D'Souza | |
| 6,484,261 B1 | 11/2002 | Wiegel | |
| 6,668,374 B1 * | 12/2003 | Sten et al. | 717/173 |
| 6,701,368 B1 * | 3/2004 | Chennapragada et al. | 709/228 |
| 6,917,626 B1 | 7/2005 | Duvvury | |
| 7,246,344 B1 | 7/2007 | Christensen et al. | |
| 7,367,028 B2 | 4/2008 | Kodosky et al. | |
| 2002/0178232 A1 * | 11/2002 | Ferguson | 709/217 |
| 2004/0030778 A1 * | 2/2004 | Kronenberg et al. | 709/224 |
| 2004/0158817 A1 | 8/2004 | Okachi et al. | |

OTHER PUBLICATIONS

Yau, S.S.; Bing Xia; , "Object-oriented distributed component software development based on CORBA," Computer Software and Applications Conference, 1998. COMPSAC '98. Proceedings. The Twenty-Second Annual International , pp. 246-251.*

Ajmani, A Review of Software Upgrade Techniques for Distributed Systems, MIT Laboratory for Computer Science, 2002, pp. 1-19.*

(Continued)

*Primary Examiner* — Wei Zhen
*Assistant Examiner* — Satish Rampuria
(74) *Attorney, Agent, or Firm* — Fish & Richardson P.C.

(57) ABSTRACT

The invention relates to upgrading software or firmware in a network. The invention simplify the process of upgrading the software or firmware by using a drag and drop mechanism. Accordingly, with the help of a user-friendly GUI, a user initiates the process of upgrading by dragging and dropping a software icon onto a device icon. The software icon may represent the software to be used for upgrading and the device icon may represent a network device including the software or firmware that is to be upgraded. A set of checks is performed during the process of upgrading. The set of checks includes checking the compatibility of the software used for upgrading with the network device.

18 Claims, 25 Drawing Sheets

OTHER PUBLICATIONS

Cisco Network, Cisco Network Assistant Quick Tips (White Paper), Fetched on Jul. 8, 2009, downloaded from http://www.cisco.com/en/US/prod/collateral/netmgtsw/ps6504/ps5931/prod_white_paper0900aecd802d1b95.html, pp. 1-22.

Software deployment, obtained from http://en.widipedia.org/wiki/Software_deployment on Dec. 8, 2009, pp. 1-6.

* cited by examiner

METHOD AND SYSTEM FOR UPGRADING SOFTWARE OR FIRMWARE BY USING DRAG AND DROP MECHANISM

CROSS-REFERENCE TO RELATED APPLICATION

This application is a continuation application of and claims priority to U.S. application Ser. No. 11/238,914, filed on Sep. 29, 2005, the contents of which are hereby incorporated by reference.

BACKGROUND OF THE INVENTION

1. Field of Invention

Embodiments of the invention relate in general to Network Management System (NMS) applications. More specifically, the embodiments of the invention relate to methods and systems for upgrading software or firmware by using a NMS application.

2. Description of the Background Art

Network Management System (NMS) applications help network administers to monitor, maintain and upgrade networks. Various conventional NMS applications include provisions to upgrade the software or firmware used on network devices in the networks. Upgrading the software or firmware is performed in order to keep the existing networks abreast with the latest technological development or due to requirements of users. The workflow for upgrading the software or firmware, using conventional NMS applications, varies depending on the file transfer protocols supported by the network devices. The conventional NMS applications generally include complex user interfaces and require manual intervention. Therefore, upgrading the software or firmware on the network devices using conventional NMS application may not be user-friendly.

Some conventional software upgrade systems use a manual dialog based mechanism. Making use of the manual dialog based mechanism, a user inputs Internet Protocol (IP) addresses of servers and network devices, a file-path of software used to upgrade and other such details. Further, software used for upgrading the software or firmware is selected manually through a file chooser dialog. In addition, conventional NMS applications support protocols like Trivial File Transfer Protocol (TFTP) and Hyper Text Transfer Protocol (HTTP). Accordingly, the user may have to select the protocol to be used, input the IP address of the TFTP server, if required, and input the file-name and the file-path of the software to be used for upgrading. The mechanism for selection is provided by the NMS applications. In addition, some of the protocols have to be configured to select a root directory to store a file corresponding to the software to be used for upgrading. Therefore, the input and selection of above-mentioned various parameters may complicate the process of upgrading, for the user.

One easy to understand and user-friendly technique of the user interface used in computers and applications is the drag and drop mechanism. Some conventional systems using the drag and drop mechanism are used for transferring files from a sender to a recipient. Accordingly, to send a file to the recipient, the user drags an icon of the file to be transferred and drops it onto an icon of the recipient. Following this, a session is established between the sender and the recipient. The file is transferred through this session.

Another conventional system that makes use of the drag and drop mechanism is used to control network devices that accept or reject messages in a network. This conventional system makes a logical representation of a network security policy. The logical representation is then converted into a machine code that enables a network device to accept or reject messages as per the network security policy. The network security policy can be applied to other network devices by dragging and dropping an icon identifying the logical representation onto an icon representing the network device.

Such conventional systems using the drag and drop mechanism, provide the user with a user-friendly interface. However, these conventional systems do not facilitate upgrading the software or firmware and conventional NMS applications for upgrading make use of complex user interfaces.

DESCRIPTION OF VARIOUS EMBODIMENTS

Various network devices in networks may include software or firmware. The software or firmware may be required to be upgraded based on various requirements or to keep up with improvements in technology. For this purpose, a new version of the original software or firmware may be used for upgrading. Various embodiments of the invention provide methods, systems and Graphical User Interfaces (GUI) for upgrading the software or firmware on a network device in a network. The process of upgrading is performed with the help of a user-friendly drag and drop mechanism.

In accordance with various embodiments of the invention, the topology of the network is automatically discovered. Discovering the topology of the network includes identifying the network devices that are connected in the network, such that each identified network device can be recognized by an Internet Protocol (IP) address. Further, the discovered network topology, available upgrade software and various options related to a process of upgrading are displayed to a user. The user then drags a first icon and drops it onto a second icon to initiate the process of upgrading. In accordance with various embodiments of the invention, the first icon represents an upgrade software used for upgrading and the second icon represents a network device that includes the software or firmware that is to be upgraded. Accordingly, the user selects the upgrade software from the available upgrade software. The upgrade software may be available on a source or on a Network Management System (NMS) workstation, in accordance with various embodiments of the invention. The upgrade software may be downloaded from the source to the NMS workstation before initiating the process of upgrade, in accordance with various embodiments of the invention. The user then drags the icon representing the selected upgrade software and drops it onto an icon representing the network device. The icon representing the network device is included in the displayed network topology. The network device is then upgraded.

The process of upgrading involves transferring the selected upgrade software to the network device. For this purpose, an identifier providing a file-path of the upgrade software is automatically generated and the IP address of the network device is also automatically detected. Therefore, the user is not required to input the file-path and the IP address during the process of upgrading. Further, during the process of upgrading the network device, a set of checks is performed. The set of checks can include checking if the selected upgrade software and network device are compatible.

Figure 1:
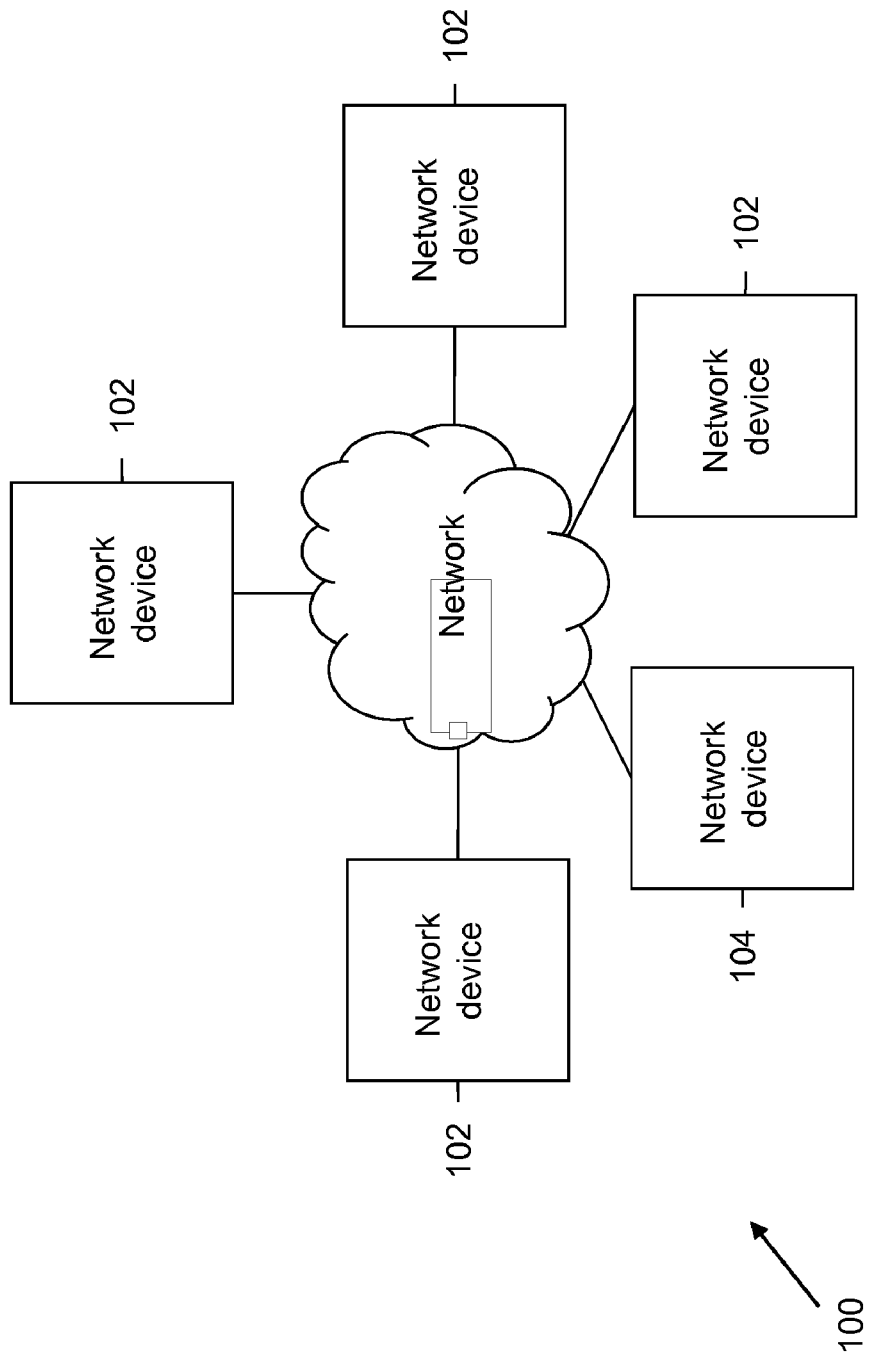
FIG. 1 is a block diagram illustrating an environment for various embodiments of the invention.

FIG. 1 is a block diagram illustrating an environment for various embodiments of the invention. A network 100 includes network devices 102. Examples of network 100 include, but are not limited to, a Local Area Network (LAN), a Wide Area Network (WAN), a Metropolitan Area Network (MAN) and the Ethernet. Examples of network devices 102 include, but are not limited to, computational devices, such as a computer and networking devices, such as a router or a switch.

Figure 2:
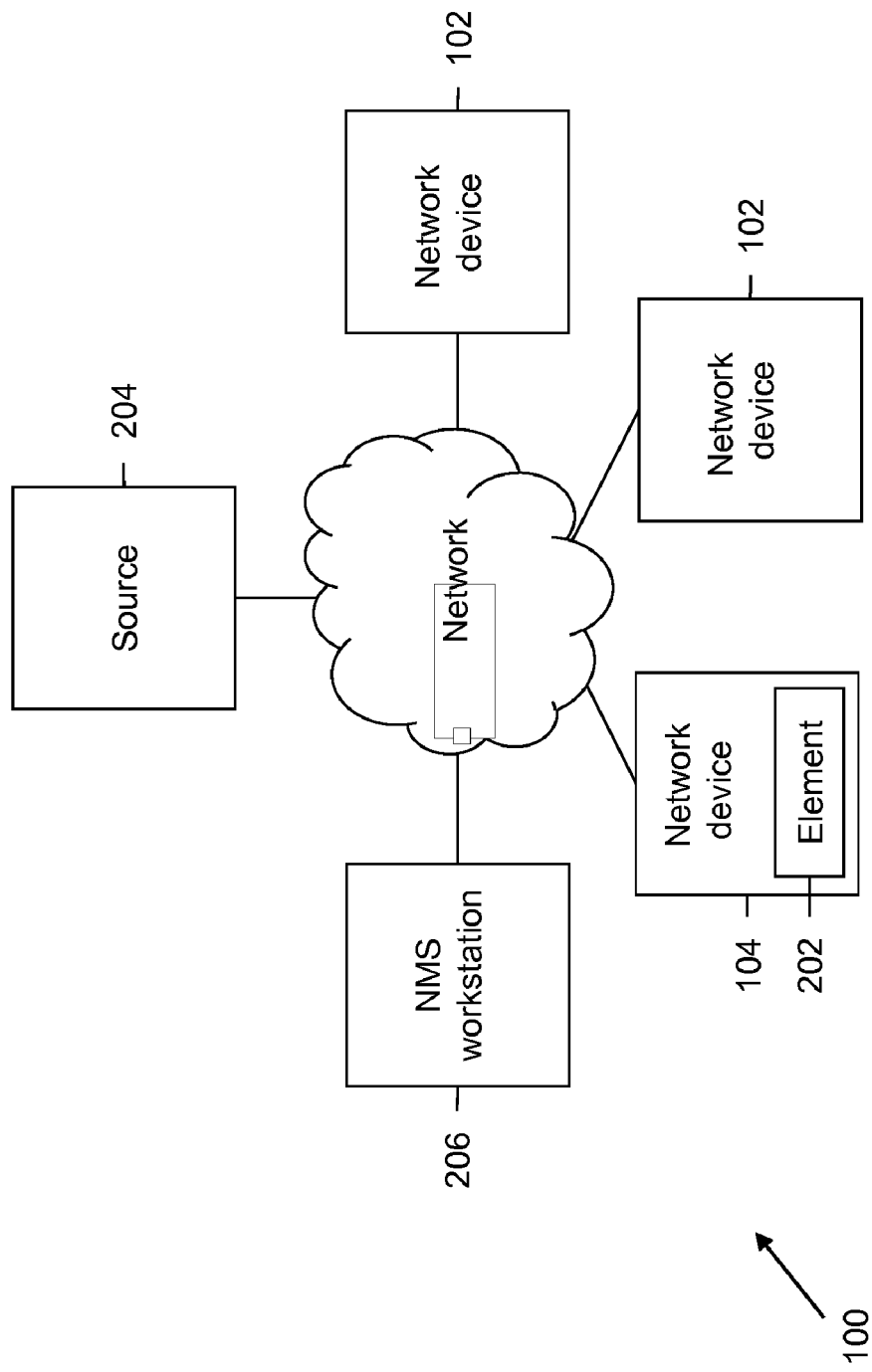
FIG. 2 is a block diagram illustrating various network devices on a network, in accordance with various embodiments of the invention.

FIG. 2 is a block diagram illustrating various network devices 102 on network 100, in accordance with various embodiments of the invention. At least one of network devices 102, hereinafter referred to as a network device 104, includes an element 202. Element 202 is software or firmware on network device 104, which is to be upgraded. For example, element 202 may be firmware of a network device 104 such as a switch. In accordance with various embodiments of the invention, element 202 is upgraded using software, hereinafter referred to as 'upgrade software'. Upgrade software can be stored on one of network devices 102, hereinafter referred to as a source 204. Source 204 may be, for example, a server such as Cisco Connection Online (CCO). CCO is a real-time support channel of Cisco Systems. CCO provides various standards and value-added services, which include software updates, product information, release notes and access to download public and authorized files. Source 204 provides information related to the upgrade software. For example, source 204 includes information related to the version and the type of the upgrade software. In accordance with an embodiment of the invention, source 204 is connected to at least one Network Management System (NMS) workstation 206 capable of running an NMS application, through network 100. In an embodiment of the invention, the connection exists only when the upgrade software is downloaded from source 204 to NMS workstation 206. NMS workstation 206 is one of network devices 102 that provides to the user information related to the process of upgrading. NMS workstation 206 may be, for example, a computer.

Upgrade software is transferred from NMS workstation 206 to network device 104. For the purpose of transfer, various protocols may be used. For example, network devices 102 may use Hyper Text Transfer Protocol (HTTP), if network devices 102 support HTTP. When HTTP is used, the process of upgrading can be performed without a separate server, as support to perform the transfer is included within network devices 102. If network devices 102 do not support HTTP, a separate server for file transfer is required. In accordance with various embodiments of the invention, NMS workstation 206 may include an embedded Trivial File Transfer Protocol (TFTP) server. In accordance with an embodiment of the invention, the use of the embedded TFTP server is made transparent to the user. Therefore, the user is not required to select the protocol to be used. When a user drags and drops a first icon onto a second icon, the embedded TFTP server starts automatically to aid the process of upgrading, without further configuration by the user.

Further, a NMS workstation 206 may have multiple Network Interface Cards (NICs) with different IP addresses and may be connected to different disjoint networks 100 through the multiple NICs. Hence, different network devices 102 may communicate with NMS workstation 206 using different NIC IP addresses. Therefore, the NMS application provides the correct IP address to network device 104, when the process of upgrading is initiated.

To identify the correct IP address of NMS workstation 206 corresponding to a network device 102, the NMS application queries all IP addresses associated with NMS workstation 206, which include all physical NICs, wireless adapters and Virtual Private Network (VPN) addresses. The NMS application makes a list of all the IP addresses and issues commands based on each of the IP addresses to network device 102 to initiate a dummy TFTP request from network device 102 to NMS workstation 206. Based on the instructions, network device 102 broadcasts dummy TFTP requests to all IP addresses. A first TFTP request that the TFTP server receives from network device 102 is viewed and an IP address corresponding to the first TFTP request is identified.

NMS workstation 206 also includes a Graphical User Interface (GUI). The GUI can display information related to the process of upgrading to a user. The display serves to guide the user through the process of upgrading.

Figure 3:
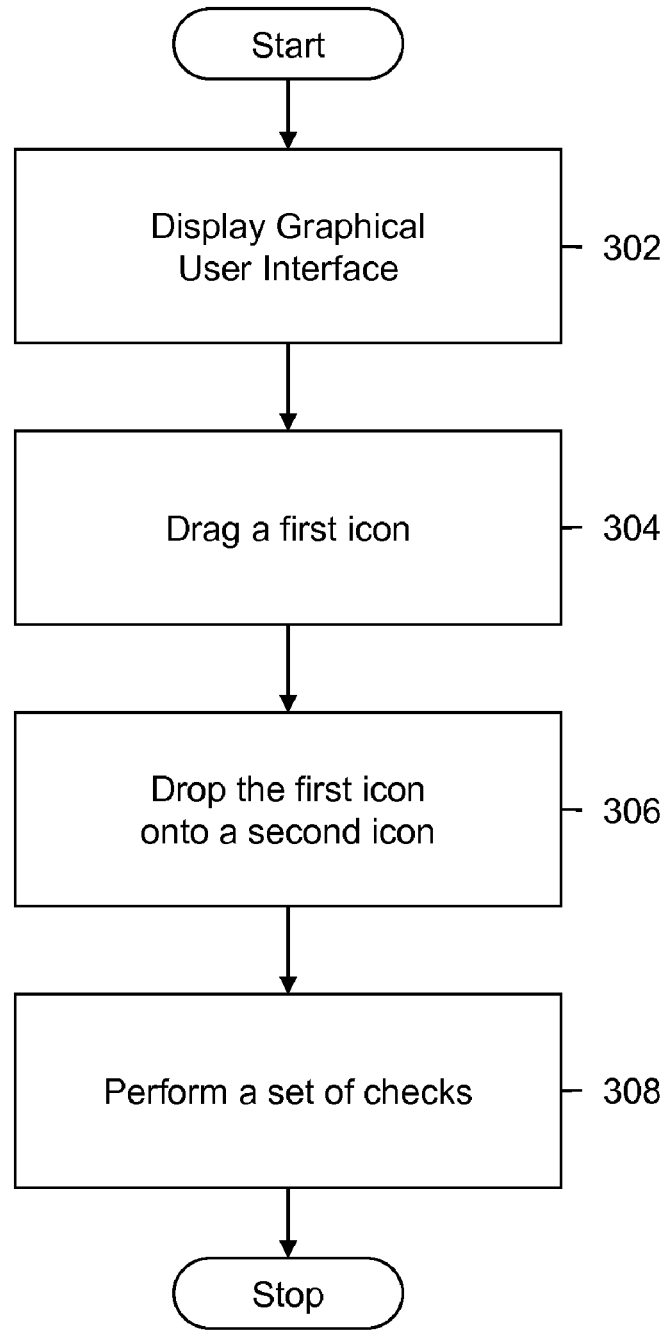
FIG. 3 is a flowchart illustrating a method for upgrading an element, in accordance with various embodiments of the invention.

FIG. 3 is a flowchart illustrating a method for upgrading element 202, in accordance with various embodiments of the invention. At step 302, the GUI is displayed on NMS workstation 206 to the user. The GUI includes a display of icons representing the upgrade software and network devices 102. At step 304, the user selects and drags a first icon. At step 306, the user drops the first icon onto a second icon to initiate the process of upgrading element 202. In accordance with an embodiment of the invention, the first icon is an icon representing the selected upgrade software and the second icon is an icon representing network device 104. The user selects the upgrade software from the available upgrade software on NMS workstation 206, in accordance with an embodiment of the invention. In accordance with an embodiment of the invention, the user can select the upgrade software from the available upgrade software on source 204. The icon representing the selected upgrade software may be, for example, the name of the selected upgrade software. In accordance with an embodiment of the invention, the first icon is an icon representing network device 104 and the second icon is an icon representing the selected upgrade software.

Following the selection of the upgrade software and network device 104, the set of checks is performed at step 308. The set of checks may include, for example, checking if the selected upgrade software is compatible with network device 104. The set of checks is performed during the process of upgrading of element 202.

Figure 4A:
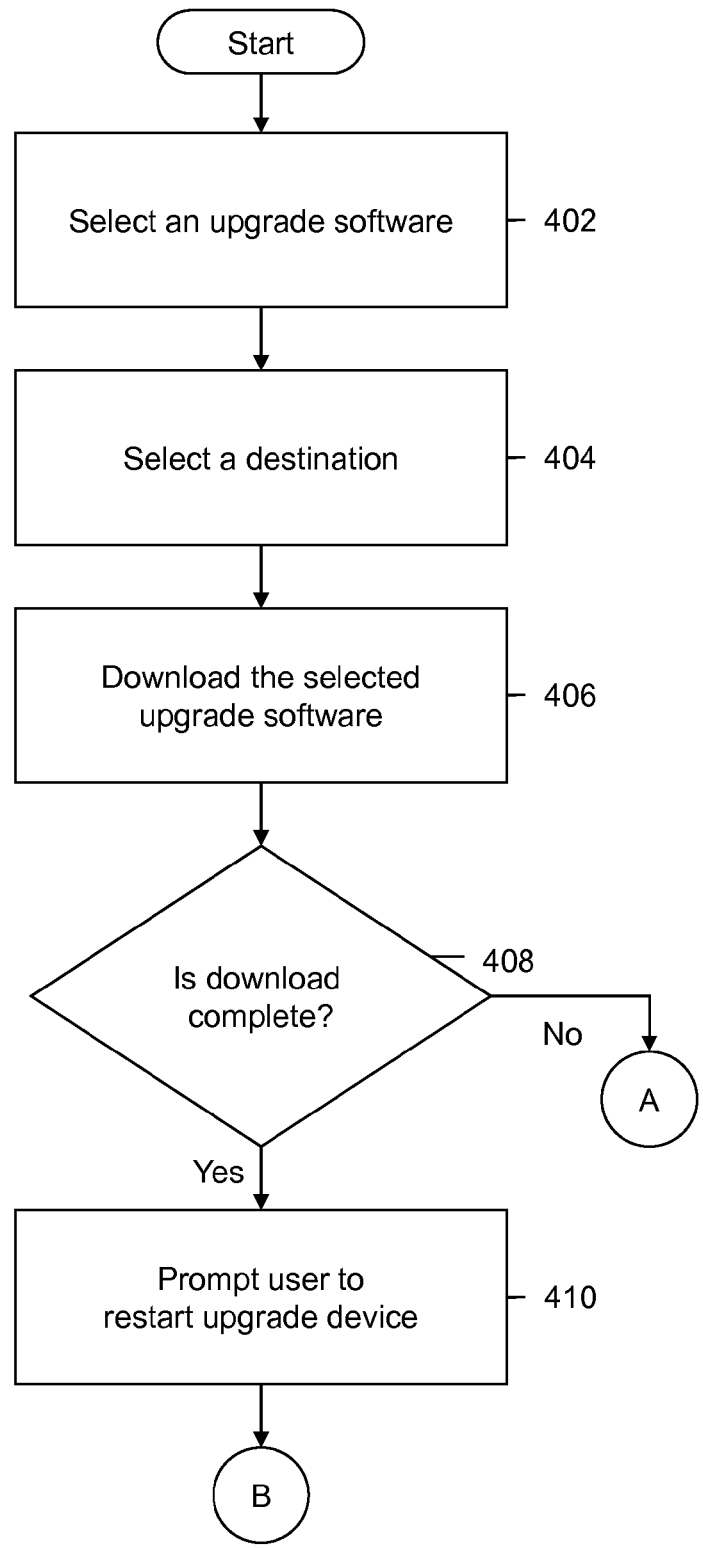
FIGS. 4a-4b show a flowchart illustrating a method for downloading upgrade software, in accordance with an embodiment of the invention.
Figure 4B:
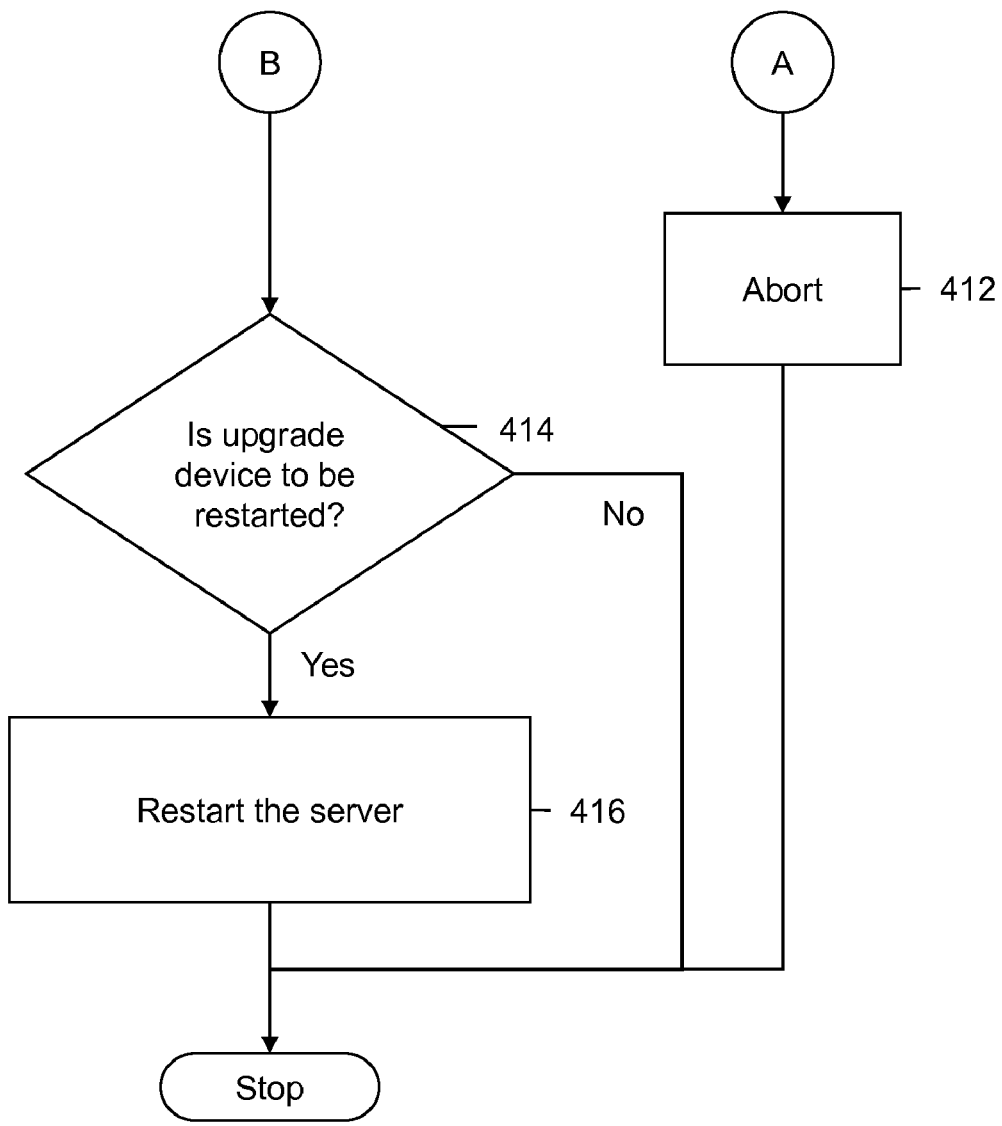

In accordance with various embodiments of the invention, the selected upgrade software is downloaded from source 204 onto NMS workstation 206 before the initiation of the process of upgrading. FIGS. 4a and 4b show a flowchart illustrating a method for downloading upgrade software, in accordance with an embodiment of the invention. For downloading the upgrade software from source 204, NMS workstation 206 has to be connected to source 204. At step 402, the user selects upgrade software from the available upgrade software on source 204. The user may choose to download the selected upgrade software, select different upgrade software or abort the process.

At step 404, the user selects a destination for saving the selected upgrade software. The destination is chosen from memory systems available with NMS workstation 206. The memory systems may include, for example, fixed memory drives and detachable memory drives. At step 406, the selected upgrade software is downloaded on NMS workstation 206. The selected upgrade software is saved at the destination selected by the user at step 404. Along with downloading the selected upgrade software, information related to the selected upgrade software is downloaded on NMS workstation 206. The information related to the selected upgrade software includes the type and version of the selected upgrade software. At step 408, it is checked if the download of the selected upgrade software is complete. At step 412, the process of upgrading is aborted, if the selected upgrade software is not completely downloaded. The selected upgrade software may not be completely downloaded due to some errors, for example, a part of selected upgrade software may be missing. The details of the errors are displayed to the user, in accordance with an embodiment of the invention. However, if the download of the selected upgrade software is complete at step 408, then step 410 is performed. At step 410, the user is prompted to restart NMS workstation 206. At step 414, it is checked if NMS workstation 206 is to be restarted, based on the user's input. If the user selects to restart NMS workstation 206, then at step 416, NMS workstation 206 is restarted. NMS workstation 206 is restarted in order to ensure that the downloaded selected upgrade software is configured to start functioning.

Figure 5:
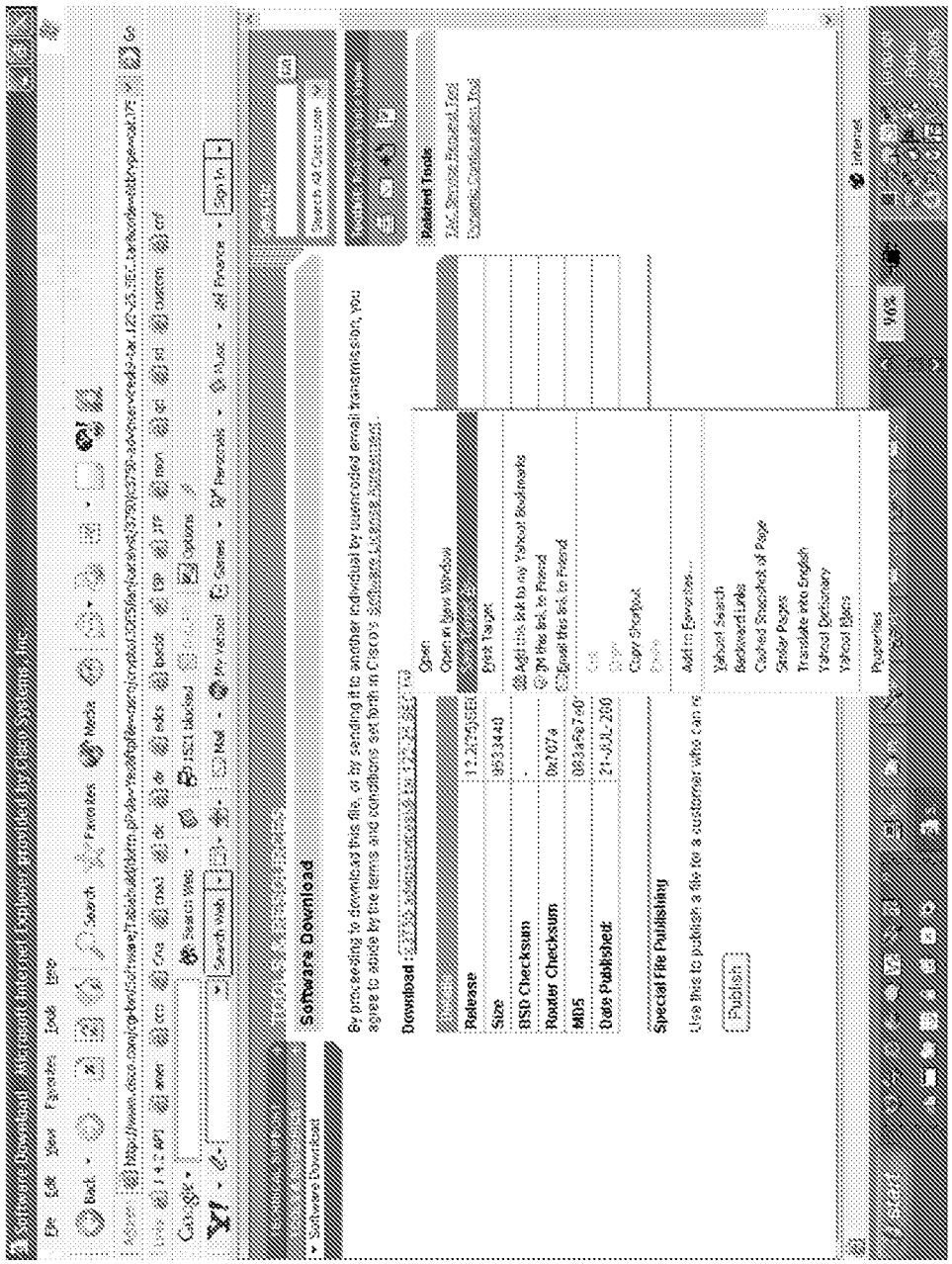
FIG. 5 is an exemplary view illustrating the upgrade software being selected by a user, in accordance with various embodiments of the invention.

FIG. 5 is an exemplary view illustrating the upgrade software being selected by the user, in accordance with various embodiments of the invention. The exemplary view displaying information about the upgrade software.

Figure 6:
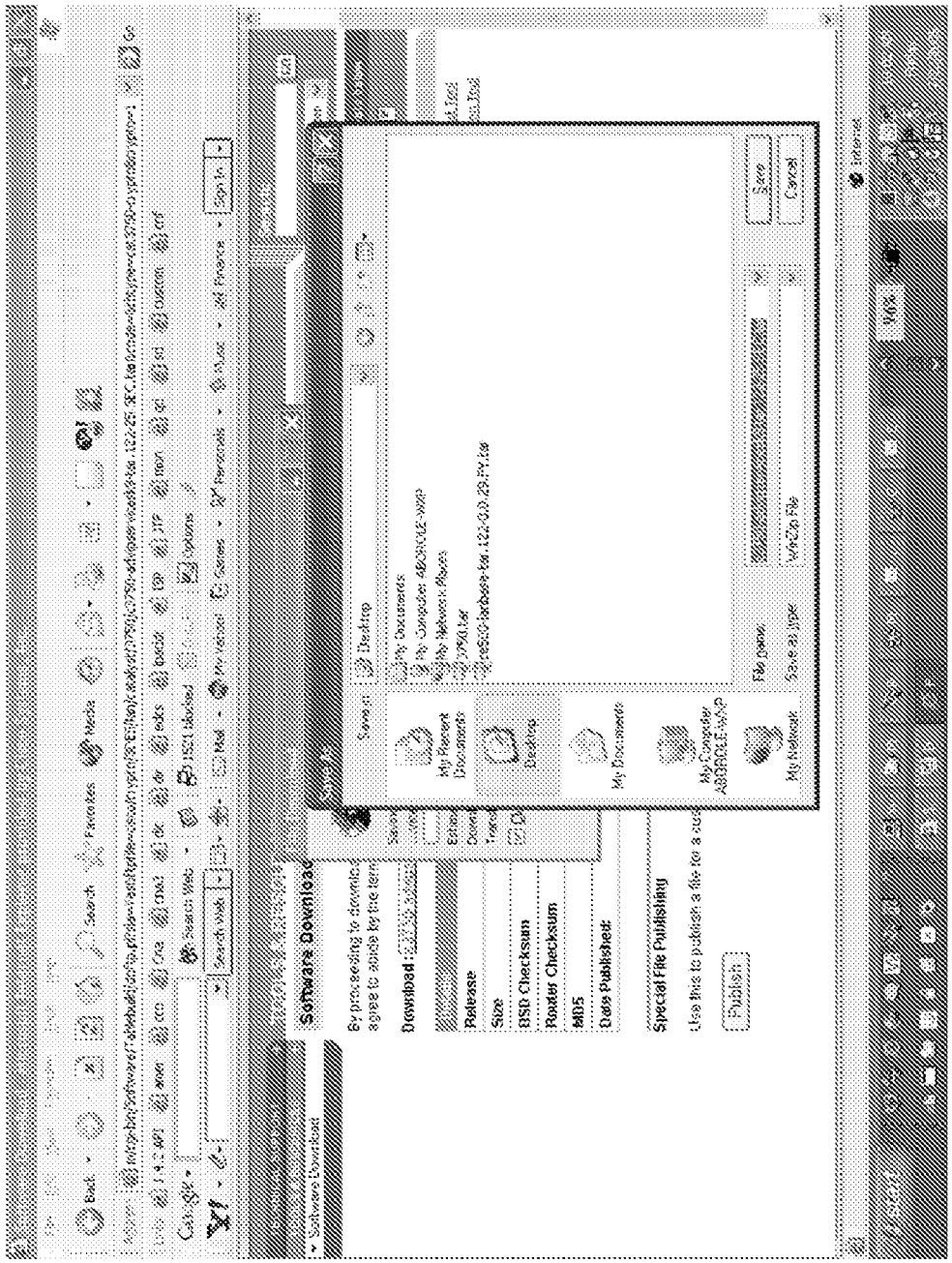
FIG. 6 is an exemplary view illustrating the destination for saving the upgrade software being selected by the user, in accordance with various embodiments of the invention.

FIG. 6 is an exemplary view illustrating the destination for saving the upgrade software being selected by the user, in accordance with various embodiments of the invention. In the exemplary view, the user chooses to save the upgrade software on the desktop of NMS workstation 206. The user may select to save the upgrade software at any destination on NMS workstation 206, in accordance with various embodiments of the invention.

Figure 7:
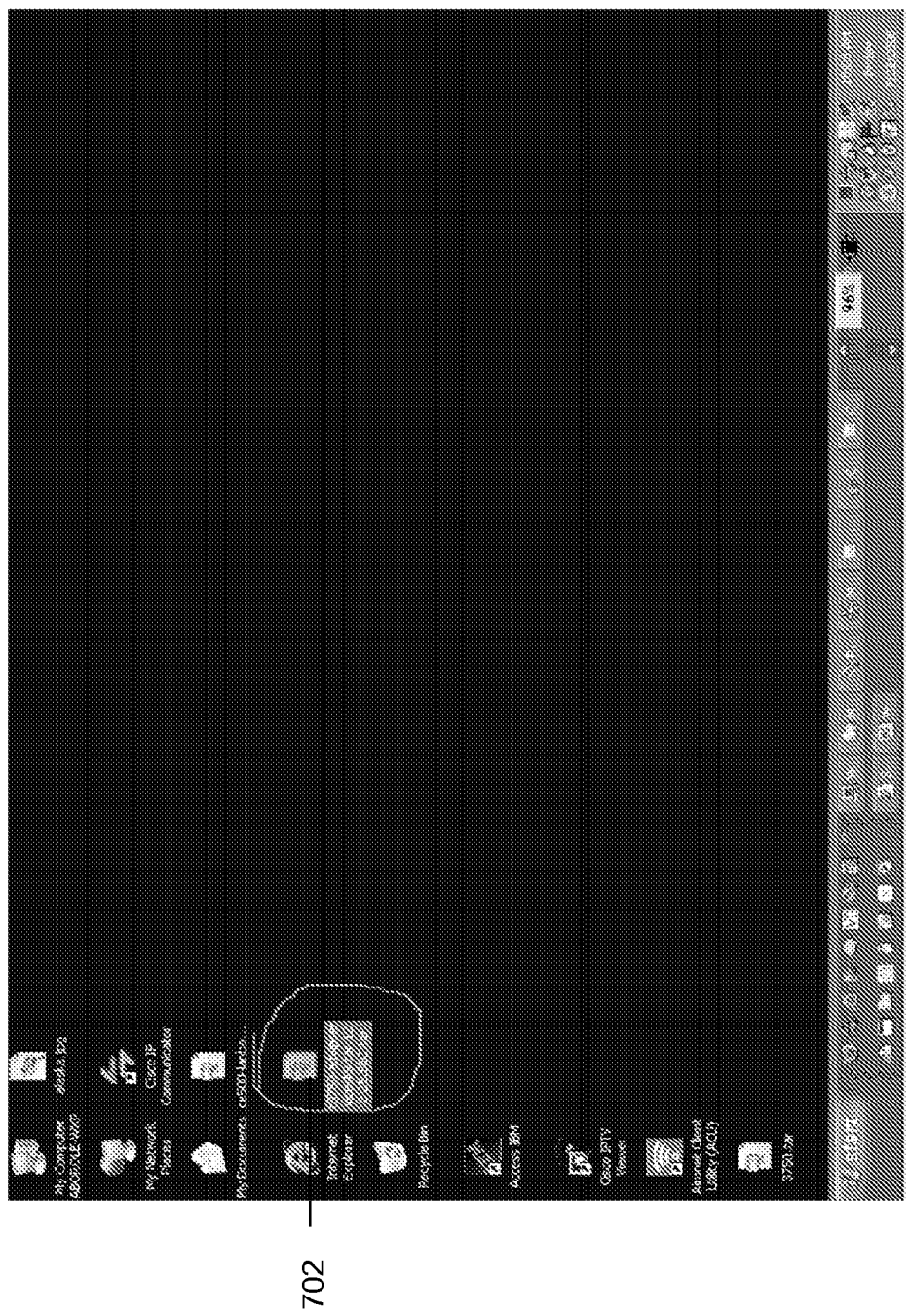
FIG. 7 is an exemplary view illustrating the display of the saved upgrade software, in accordance with various embodiments of the invention.

FIG. 7 is an exemplary view illustrating the display of saved upgrade software, in accordance with various embodiments of the invention. The exemplary view displays an icon 702 representing saved upgrade software, on the desktop of NMS workstation 206.

After the download of the selected upgrade software on NMS workstation 206 is complete, an identifier is generated. The identifier includes a file-path of the selected upgrade software on NMS workstation 206. This identifier is referred to when network device 104 requires the location of the downloaded selected upgrade software for upgrading element 202.

Figure 8:
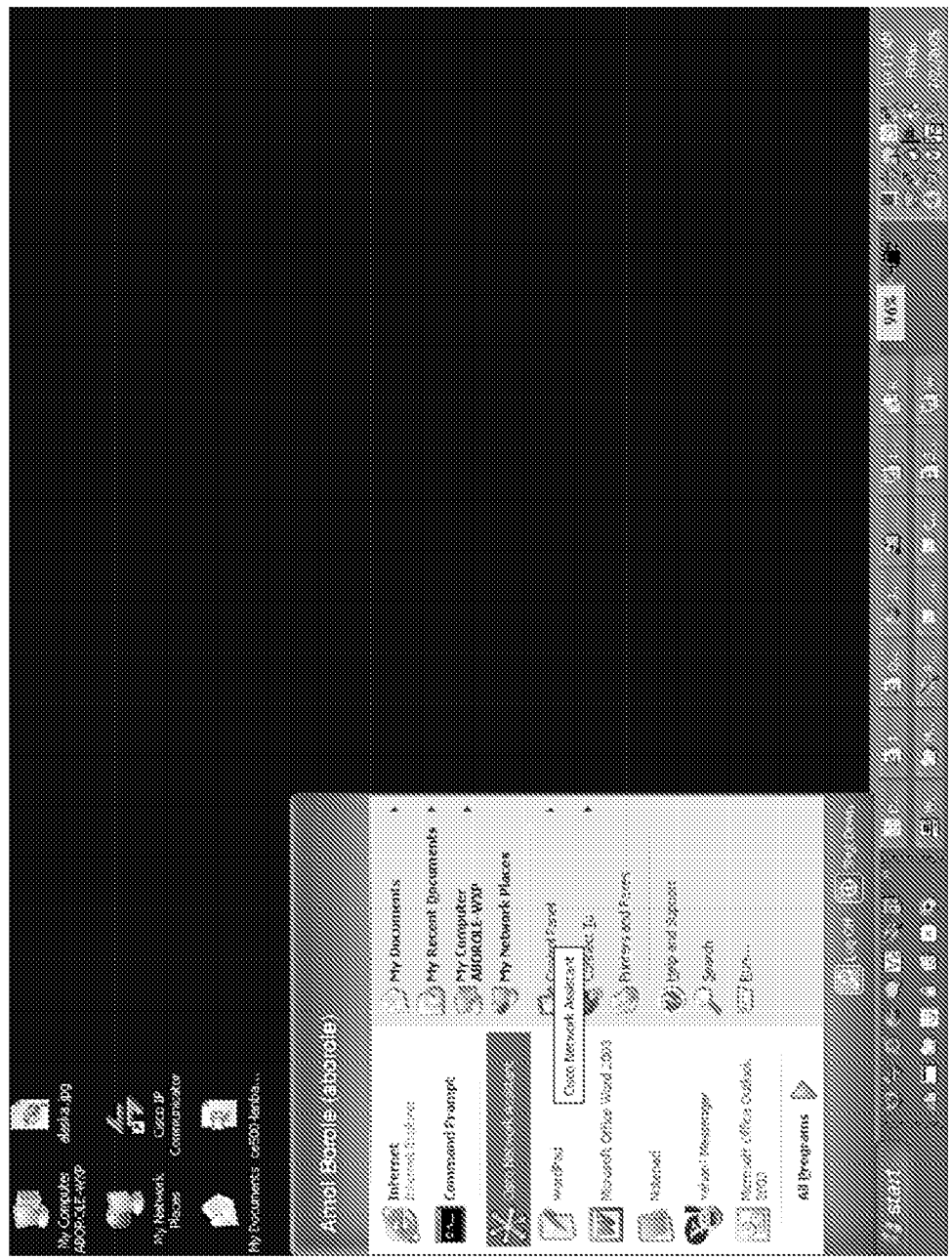
FIG. 8 is an exemplary view illustrating the launch of a Network Management System (NMS) application by the user, in accordance with various embodiments of the invention.

After performing the process of downloading the upgrade software, the NMS application may be launched on NMS workstation 206. FIG. 8 is an exemplary view illustrating the launch of the NMS application by the user, in accordance with various embodiments of the invention. The NMS application can be launched on NMS workstation 206 before the download of the upgrade software, in accordance with an embodiment of the invention.

In accordance with various embodiments of the invention, when the NMS application is launched, various options for device identification techniques are displayed to the user. The device identification techniques help in assigning IP addresses to network devices 102. The device identification techniques may include, for example, an auto-detection technique, a clustering technique and a community technique. The auto-detection technique is used to automatically detect network devices 102. Clustering technique and community technique are device identification techniques that can be used to discover the topology of network 100.

Figure 9A:
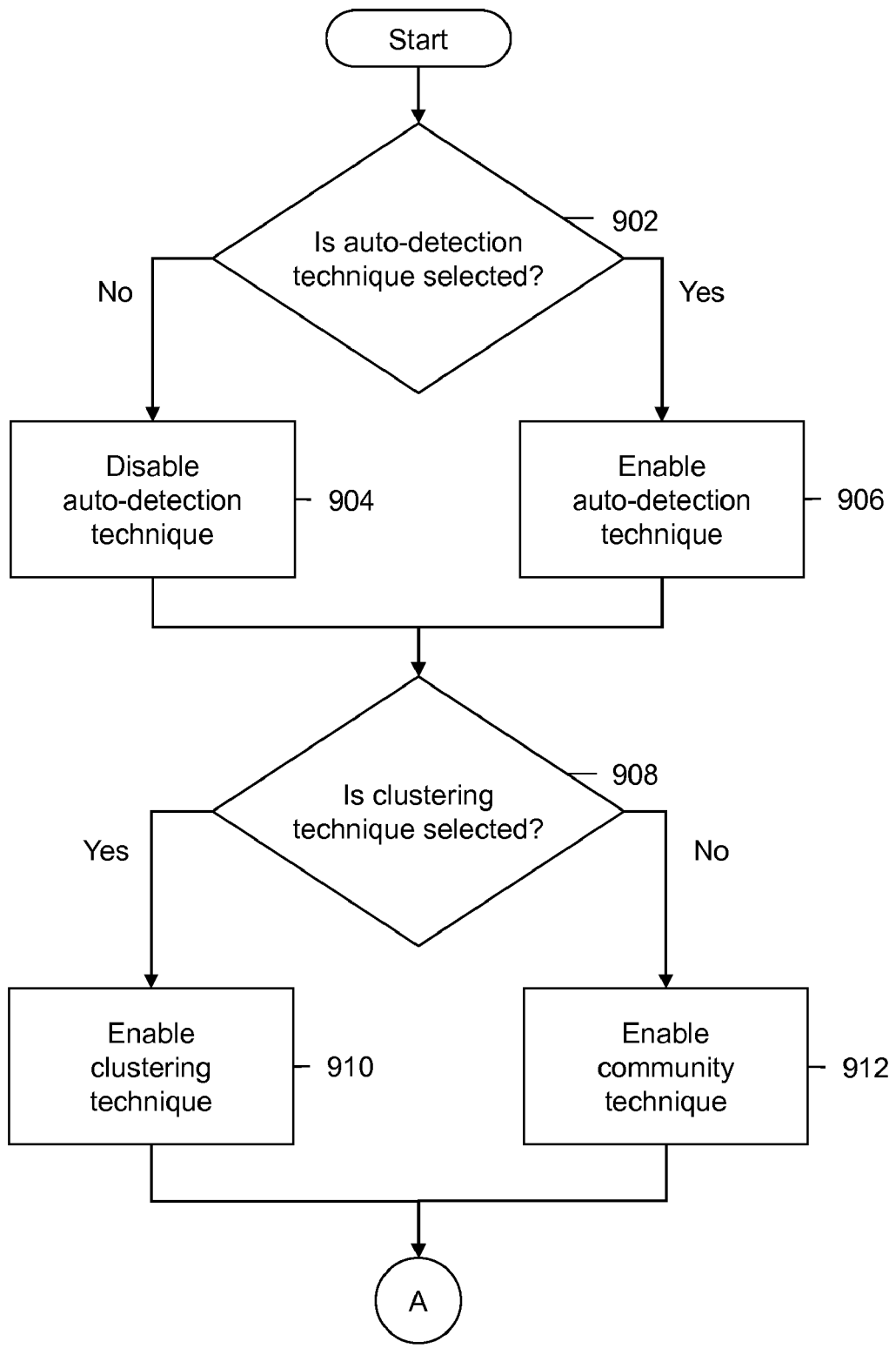
FIGS. 9a-9b show a flowchart illustrating a method for displaying a topology of the network, in accordance with an embodiment of the invention.
Figure 9B:
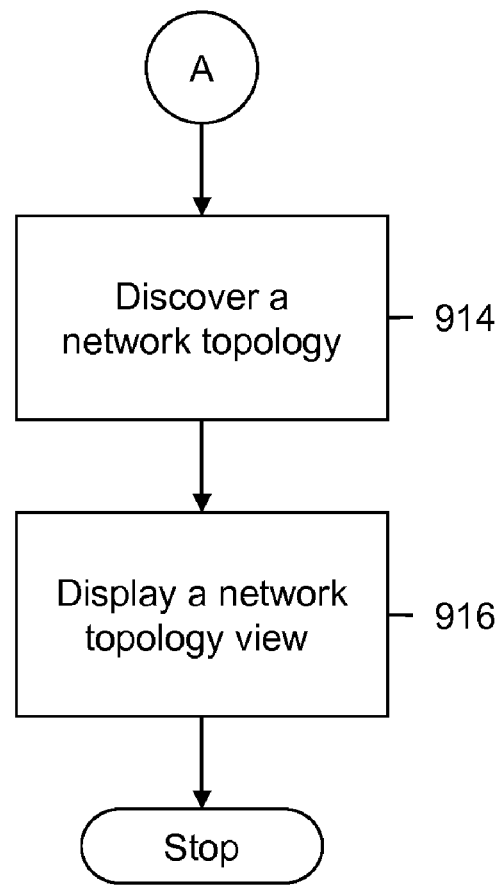

FIGS. 9a and 9b show a flowchart illustrating a method for displaying the topology of network 100, in accordance with an embodiment of the invention. The user selects a device identification technique from the options displayed in the GUI of the NMS application. At step 902, it is checked if the user selected the auto-detection technique. At step 904, the auto-detection technique is disabled if the user did not select the auto-detection technique. However, if the user selected the auto-detection technique, then at step 906, the auto-detection technique is enabled. At step 908, it is checked if the user selected the clustering technique. At step 910, the clustering technique is enabled, if the user selected the clustering technique. However, if the user did not select the clustering technique, then in accordance with various embodiments of the invention, at step 912, the community technique is enabled. At step 914, the topology of network 100 is discovered based on the device identification technique selected by the user. At step 916, a view of the topology of network 100, providing a representation of the discovered topology, is displayed to the user.

In accordance with various embodiments of the invention, network 100 includes auto-smartports that are enabled if the auto-detection technique is enabled. The auto-smartports are capable of monitoring and detecting new network devices 102 connected to the auto-smartports. Once the auto-smartports are enabled, new network devices 102 connected to network 100 are detected according to a method described with respect to FIG. 10.

Figure 10:
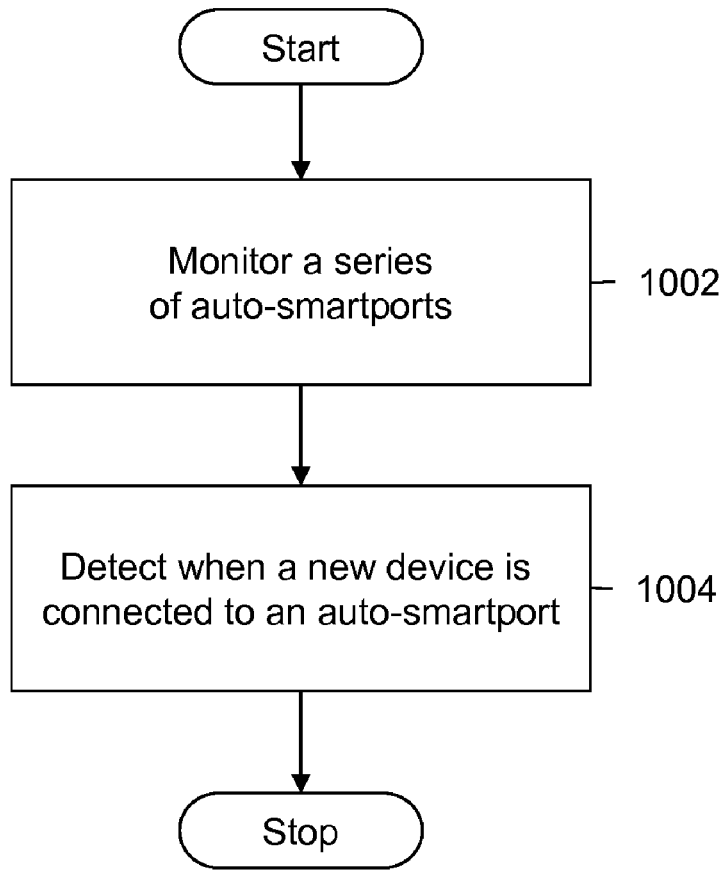
FIG. 10 is a flowchart illustrating a method for discovering the topology of the network, using an auto-detection technique, in accordance with an embodiment of the invention.

FIG. 10 is a flowchart illustrating a method for discovering the topology of network 100, using an auto-detection technique, in accordance with an embodiment of the invention. At step 1002, the auto-smartports are monitored. Further, whenever one of network devices 102 is connected to any auto-smartport, it is detected, at step 1004. In accordance with an embodiment of the invention, when one of network devices 102 is detected, the user is prompted to upgrade detected network device 102 by upgrade software, when such upgrade software is available with NMS workstation 206. Network devices 102 that are detected by the auto-smartports are taken into account while discovering the topology of network 100 by device identification techniques, such as clustering technique and community technique.

Figure 11:
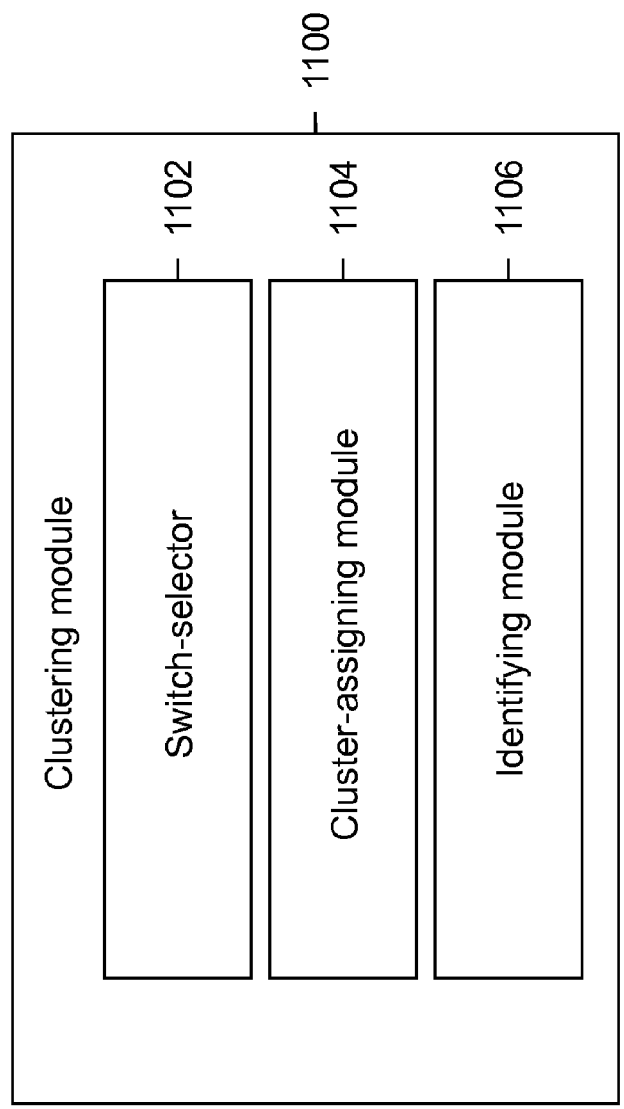
FIG. 11 is a block diagram illustrating a clustering module, in accordance with an embodiment of the invention.

FIG. 11 is a block diagram illustrating a clustering module 1100, in accordance with an embodiment of the invention. In an embodiment of the invention, clustering module 1100 is included in NMS workstation 206. As described earlier, clustering module 1100 is enabled when the user selects the clustering technique for device identification, at step 908. Clustering module 1100 creates clusters of network devices 102 and assigns IP addresses to the clusters. A cluster is a group of multiple switches that are considered as a single identity for the purpose of assigning IP addresses. The technique of forming clusters is known as clustering technique.

Clustering module 1100 includes a switch-selector 1102, a cluster-assigning module 1104 and an identifying module 1106. Switch-selector 1102 provides a list of switches included within network devices 102. In accordance with various embodiments of the invention, the list of switches may be displayed to the user if the user selects the clustering technique. The user may then select the switches from the list of switches to form various clusters. Cluster-assigning module 1104 assigns an IP address to each cluster, hence, each cluster is identified by its assigned IP address. Identifying module 1106 identifies network devices 102 supported by each cluster.

Figure 12:
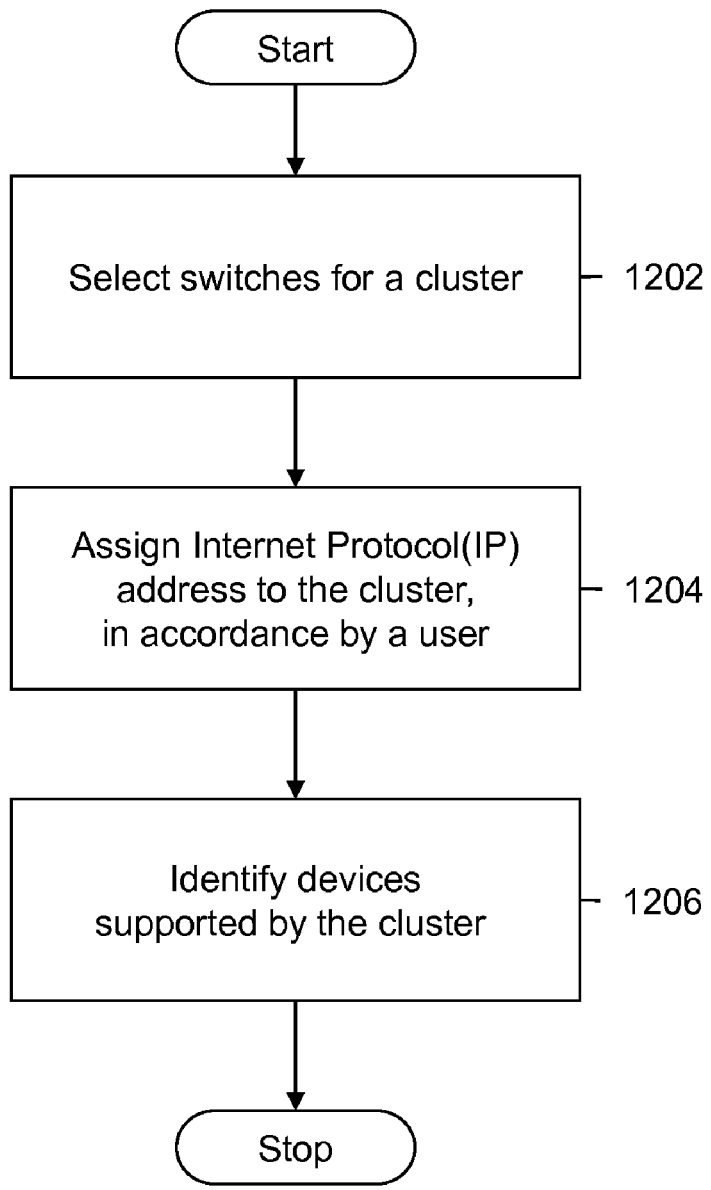
FIG. 12 is a flowchart illustrating a method for discovering the topology of the network, using a clustering technique, in accordance with an embodiment of the invention.

FIG. 12 is a flowchart illustrating a method for discovering the topology of network 100, using a clustering technique, in accordance with an embodiment of the invention. At step 1202, the user selects the switches that are to be included in the various clusters to be formed. Accordingly, clusters are formed based on the selected switches. At step 1204, with the help of cluster-assigning module 1104, the user assigns an IP address to each cluster. At step 1206, network devices 102 supported by each cluster are identified without manual intervention from the user. Once network devices 102 supported by each cluster are identified, the topology of network 100 is discovered and displayed to the user.

Figure 13:
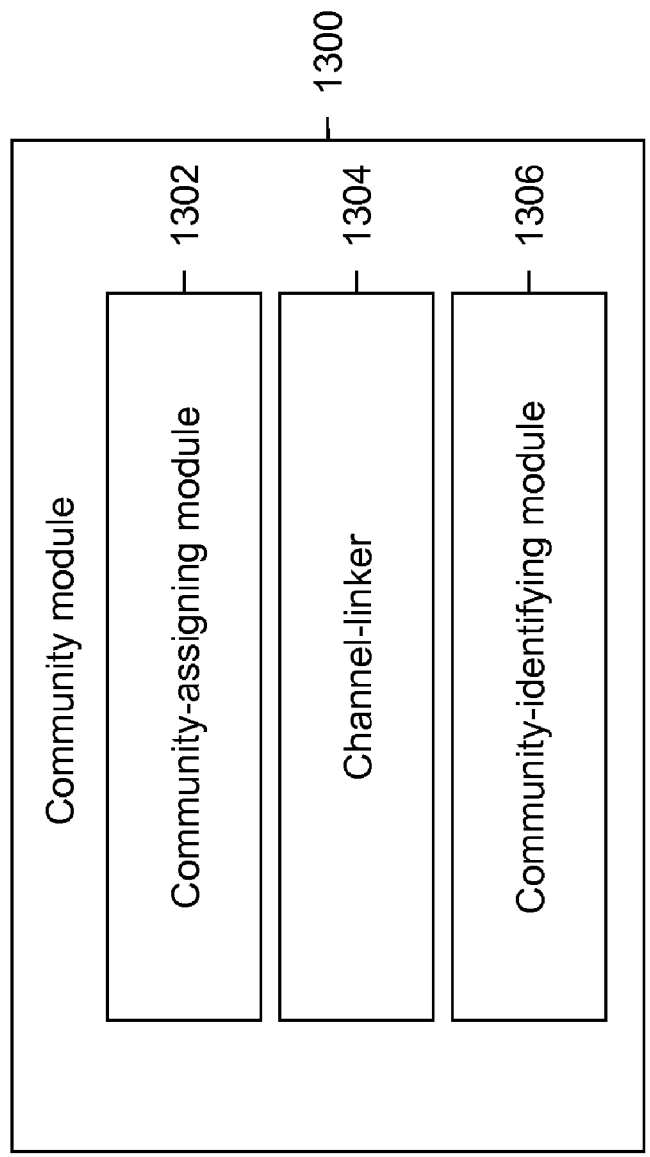
FIG. 13 is a block diagram illustrating a community module, in accordance with an embodiment of the invention.

An alternative to the clustering technique is the community technique. FIG. 13 is a block diagram illustrating a community module 1300, in accordance with an embodiment of the invention. In an embodiment of the invention, community module 1300 is included in NMS workstation 206. Community module 1300 is enabled when the user selects the community technique for device identification. Community module 1300 comprises a community-assigning module 1302, a channel-linker 1304 and a community-identifying module 1306. Community-assigning module 1302 assigns IP addresses to networking devices among network devices 102. Networking devices include, for example, routers and switches. Channel-linker 1304 connects networking devices for communication. Whenever one of network devices 102 is detected using the auto-detection technique, it needs to be configured in order to work in conjunction with the auto-smartports. Therefore, for configuration, one of network devices 102 detected by the auto-smartports is communicated a set of appropriate configuration commands. This communication is carried out through the connections provided by channel-linker 1304. Community-identifying module 1306 identifies network devices 102 supported by the networking devices.

Figure 14:
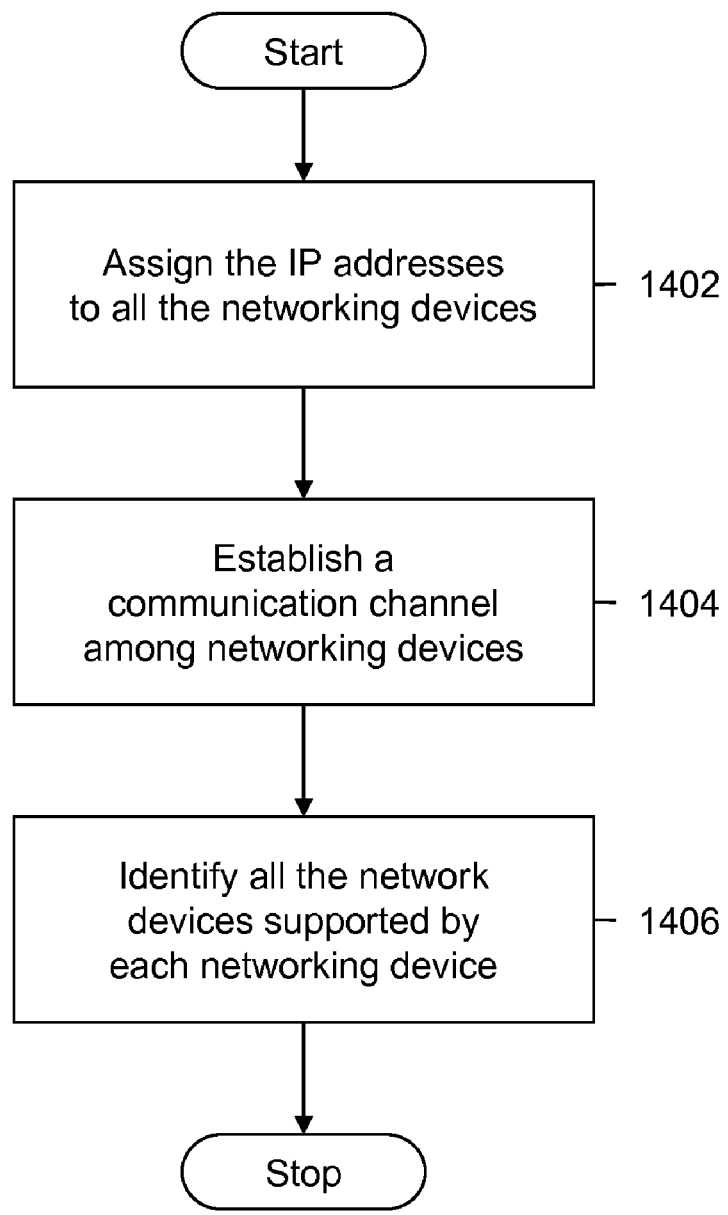
FIG. 14 is a flowchart illustrating a method for discovering the topology of the network, using a community technique, in accordance with an embodiment of the invention.

FIG. 14 is a flowchart illustrating a method for discovering the topology of network 100, using a community technique, in accordance with an embodiment of the invention. At step 1402, community-assigning module 1302 assigns IP addresses to the networking devices of network 100. At step 1404, channel-linker 1304 connects the networking devices. The connection is established to enable communication between the networking devices. At step 1406, community-identifying module 1306 identifies network devices 102 supported by each networking device on network 100. Once supported network devices 102 are identified, the topology of network 100 is discovered.

In accordance with an embodiment of the invention, the discovered topology is scanned along with the available upgrade software. Further, the user is intimated when a network device 104 may be upgraded using upgrade software, in case such a network device 104 and upgrade software are identified. The user may then initiate the process of upgrading element 202 included in identified network device 104.

Figure 15:
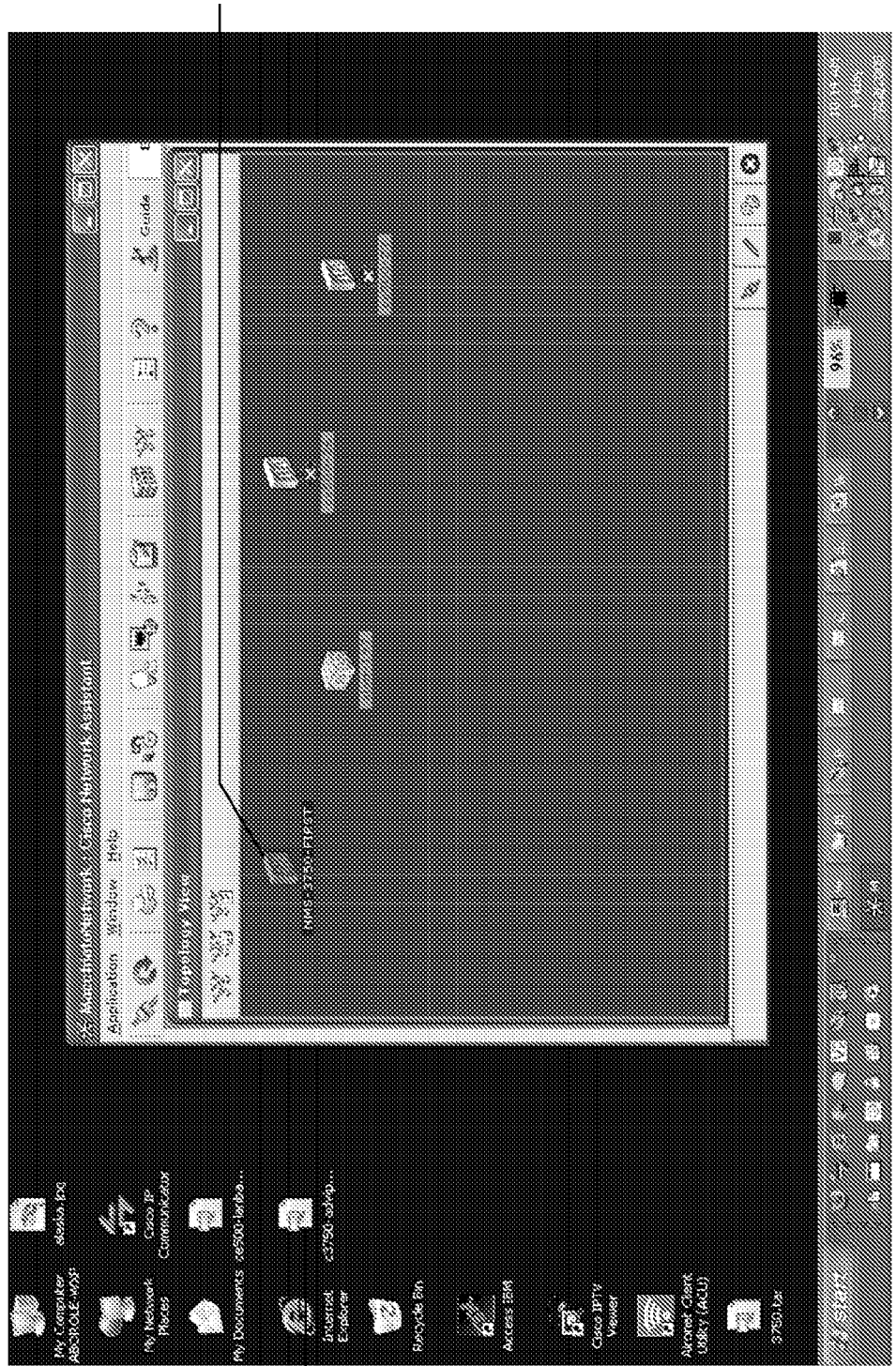
FIG. 15 is an exemplary view illustrating the topology of the network, in accordance with various embodiments of the invention.

FIG. 15 is an exemplary view illustrating the topology of network 100, in accordance with various embodiments of the invention. The topology of network 100 can be discovered by using any of the techniques described earlier. Once the topology of network 100 is discovered, the GUI can display the topology of network 100. The exemplary view includes icons representing network devices 102. The exemplary view displays an icon 1502 representing network device 104. The displayed icons help the user to easily choose and identify network device 104 for upgrading.

Figure 16:
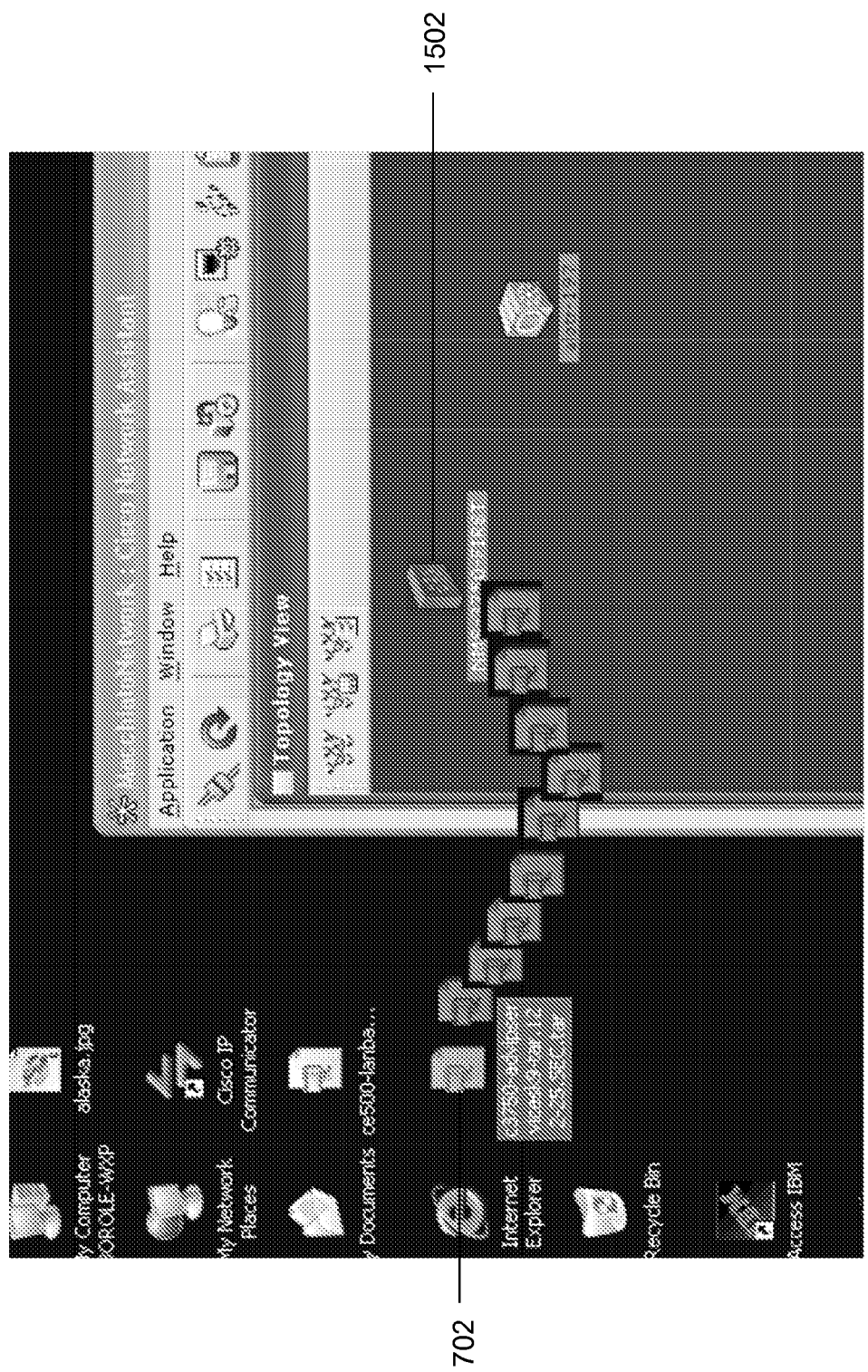
FIG. 16 is an exemplary view illustrating a first icon being dragged and dropped onto a second icon, in accordance with various embodiments of the invention.

FIG. 16 is an exemplary view illustrating icon 702 being dragged and dropped onto icon 1502, in accordance with various embodiments of the invention. Once icon 702 is dragged and dropped onto icon 1502, the process of upgrading is initiated.

Once the process of upgrading is initiated, the selected upgrade software is screened. Screening includes determining a certification-status assigned to the selected upgrade software by source 204. The certification-status of upgrade software may be, for example, certified, uncertified or unsupported. A certified status is assigned to the upgrade software that meets standard requirements, while an uncertified status is assigned to the upgrade software that does not meet the standard requirements. If the certification-status of the upgrade software is unsupported, an error message indicating that the upgrade software is not valid for network device 104 is displayed. Further, the certification-status assigned to the upgrade software is updated from source 204 and is displayed to the user. In accordance with various embodiments of the invention, the certification-status is displayed to the user in a pop-up. Further, the pop-up may ask the user to confirm to proceed with the process of upgrading, in accordance with an embodiment of the invention. If the user chooses to proceed with the process of upgrading, the set of checks are performed.

Figure 17A:
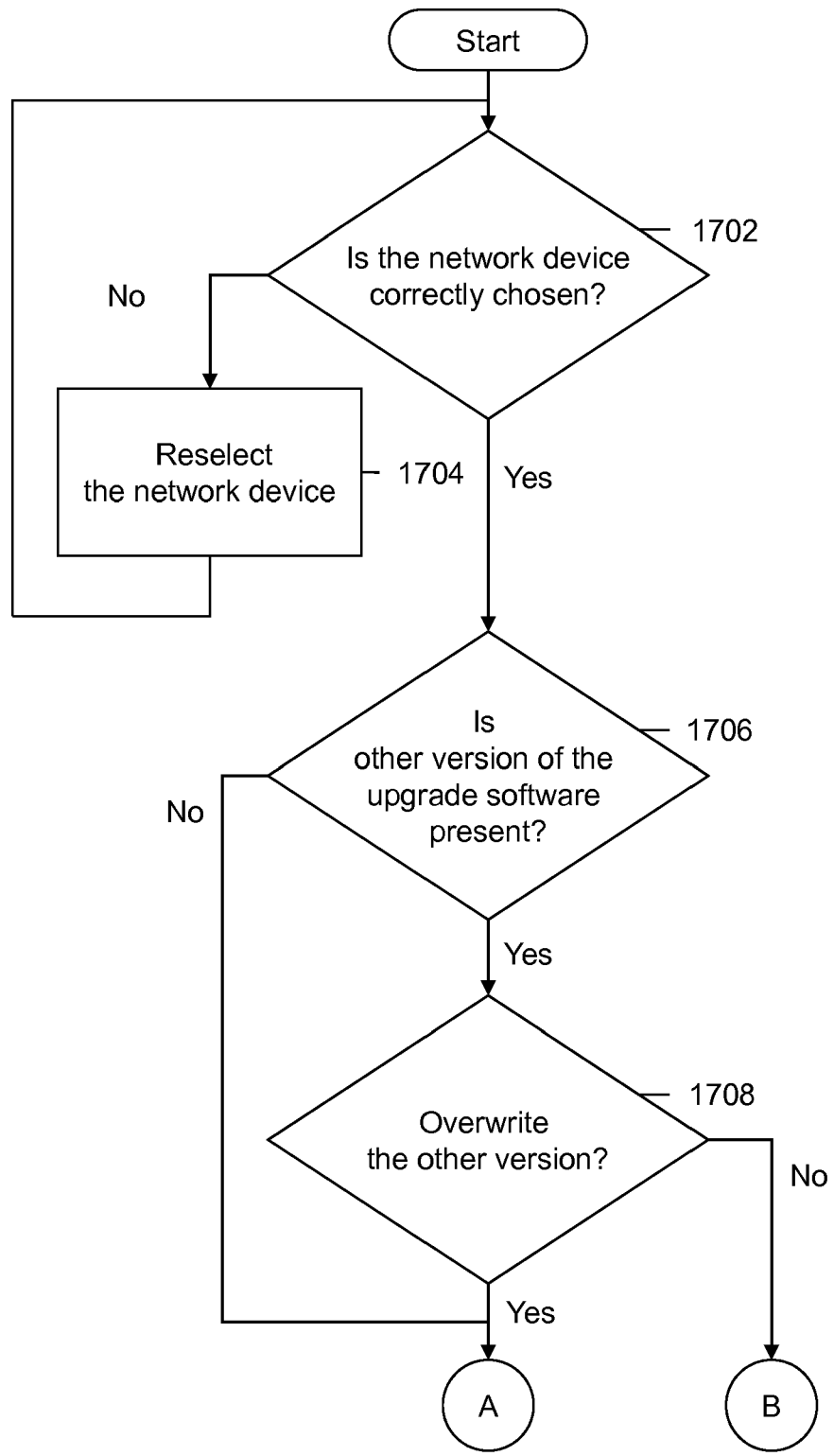
FIGS. 17a-17b show a flowchart illustrating a method for performing a set of checks while upgrading the element, in accordance with an embodiment of the invention.
Figure 17B:
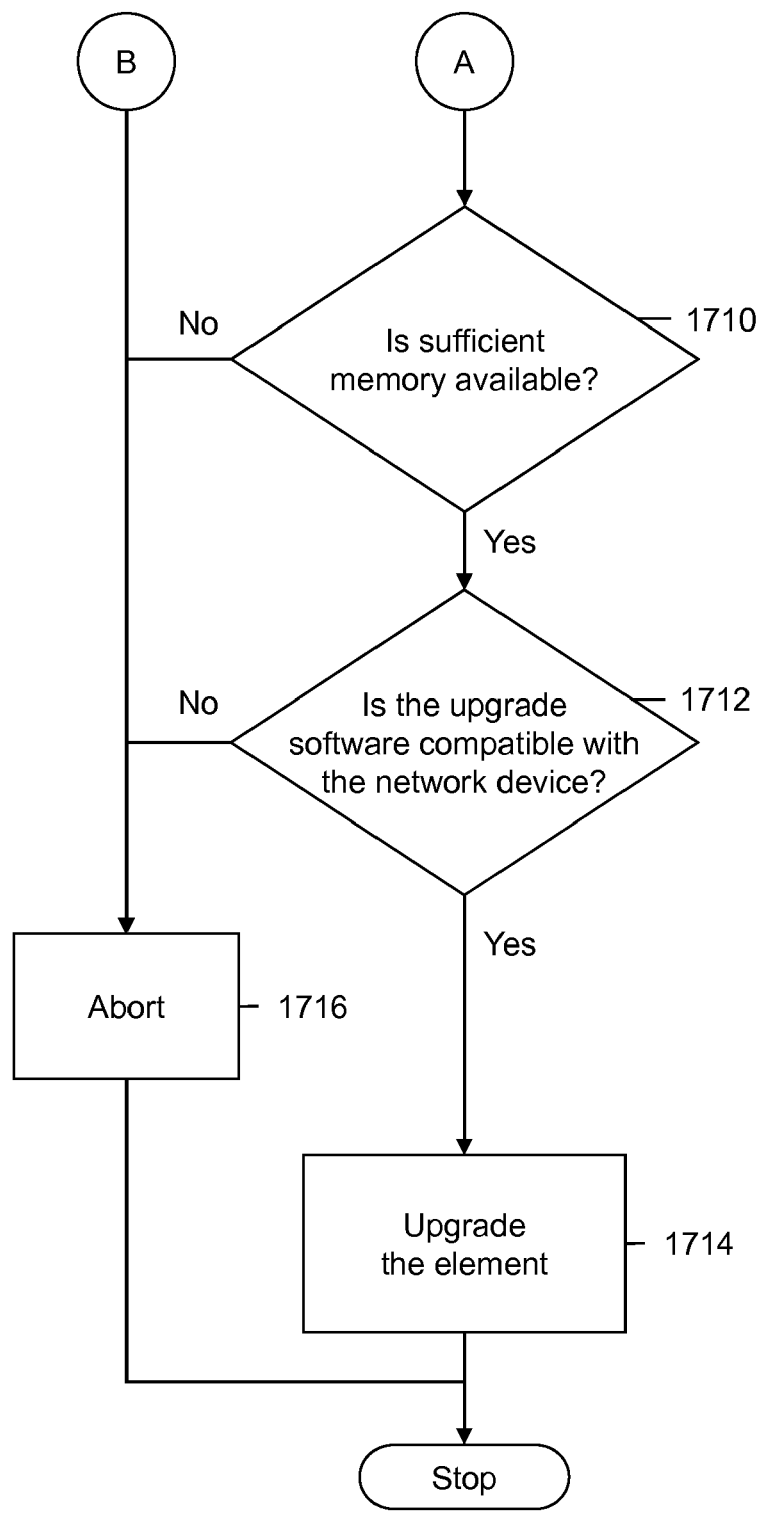

FIGS. 17a and 17b show a flowchart illustrating a method for performing the set of checks while upgrading element 202, in accordance with an embodiment of the invention. The set of checks ensures that network device 104 and upgrade software are correctly chosen by the user. In accordance with various embodiments of the invention, when the user drags and drops the first icon onto the second icon, the user is prompted to confirm that the user has correctly chosen network device 104. At step 1702, it is checked if the user confirmed network device 104 to be correctly chosen. At step 1704, the user may select another one of network devices 102, if at step 1702 it is found that the user incorrectly chose network device 104. Step 1702 is repeated, if the user selects another network device 102 at step 1704. At step 1706, it is checked if a version of the selected upgrade software is present on network device 104. If a version of the selected upgrade software is detected, then the user is informed that the detected version will be overwritten by the selected upgrade software. The user is prompted to confirm overwriting the detected version. At step 1708, it is checked if the user confirmed overwriting the detected version.

If at step 1706 no version of the selected upgrade software is detected, or if at step 1708 the user confirmed overwriting the detected version, then step 1710 is performed. At step 1710, memory available on network device 104 is checked. This check is performed to confirm that there is sufficient memory available for upgrading of element 202 by the selected upgrade software. If sufficient memory is available for upgrading element 202, then step 1712 is performed. At step 1712, it is checked if the selected upgrade software is compatible with network device 104. In accordance with various embodiments of the invention, the check for compatibility is performed before checking for the presence of a version of the selected upgrade software or checking the available memory. At step 1714, element 202 is upgraded, if the selected upgrade software and network device 104 are compatible. In accordance with an embodiment of the invention, the user is prompted to confirm that element 202 is to be upgraded. Once the user confirms the process of upgrading, element 202 is upgraded.

At step 1716, the process of upgrading is aborted, if at step 1712 it is found that the selected upgrade software and network device 104 are incompatible. Further, in accordance with step 1716, the process of upgrading is aborted, if at step 1708 the user selects not to overwrite the detected version, or if at step 1710 it is found that the available memory is insufficient. In accordance with various embodiments of the invention, if insufficient memory is available, the user is prompted to free memory of network device 104 in order to upgrade element 202.

Figure 18:
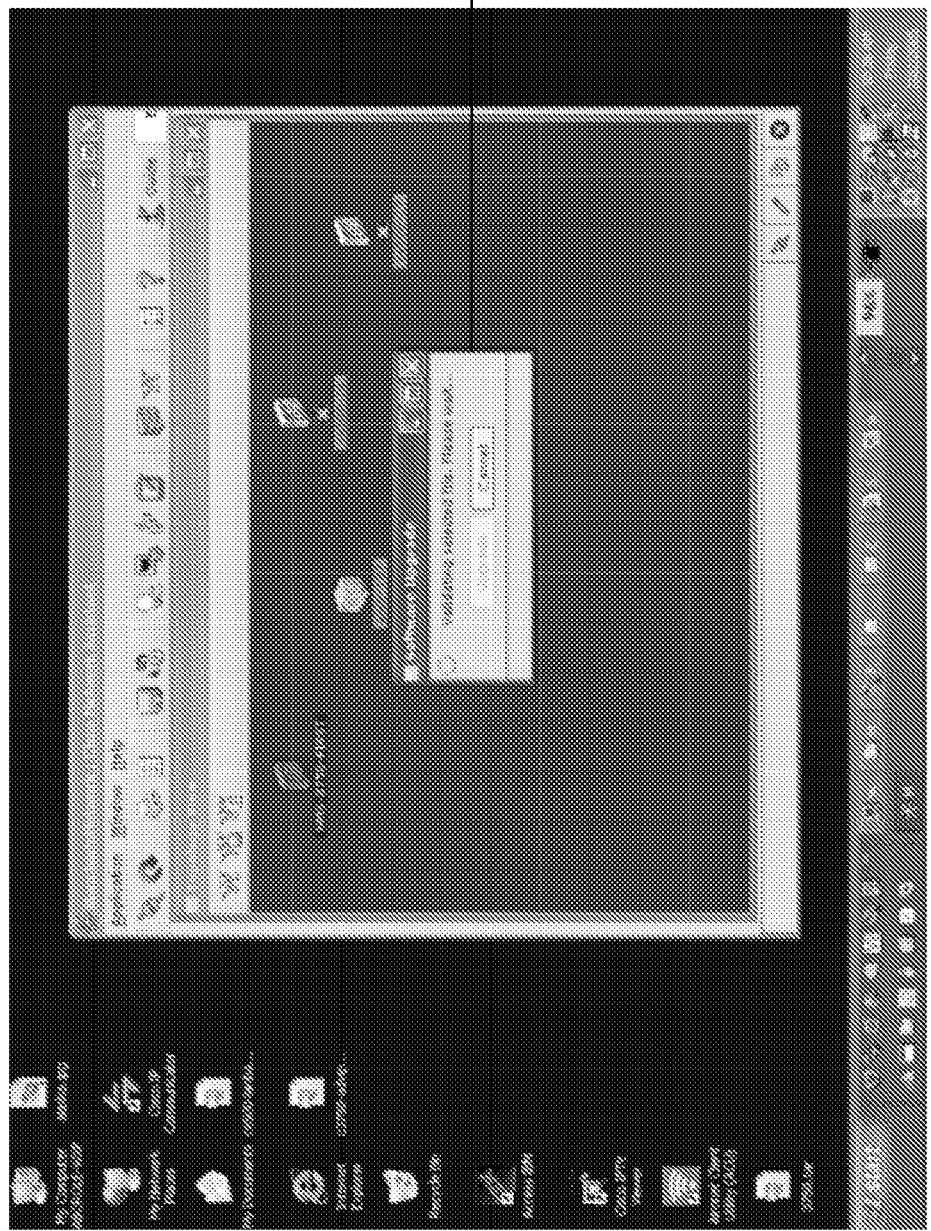
FIG. 18 is an exemplary view illustrating a validation process for checking the compatibility between the upgrade software and a selected network device, in accordance with various embodiments of the invention.

FIG. 18 is an exemplary view illustrating a validation process for checking the compatibility between the upgrade software and network device 104, in accordance with various embodiments of the invention. The exemplary view displays a pop-up 1802 displaying the validation process. In accordance with an embodiment of the invention, the details of the process of upgrading are displayed to the user, when the upgrade software and network device 104 are compatible.

Figure 19:
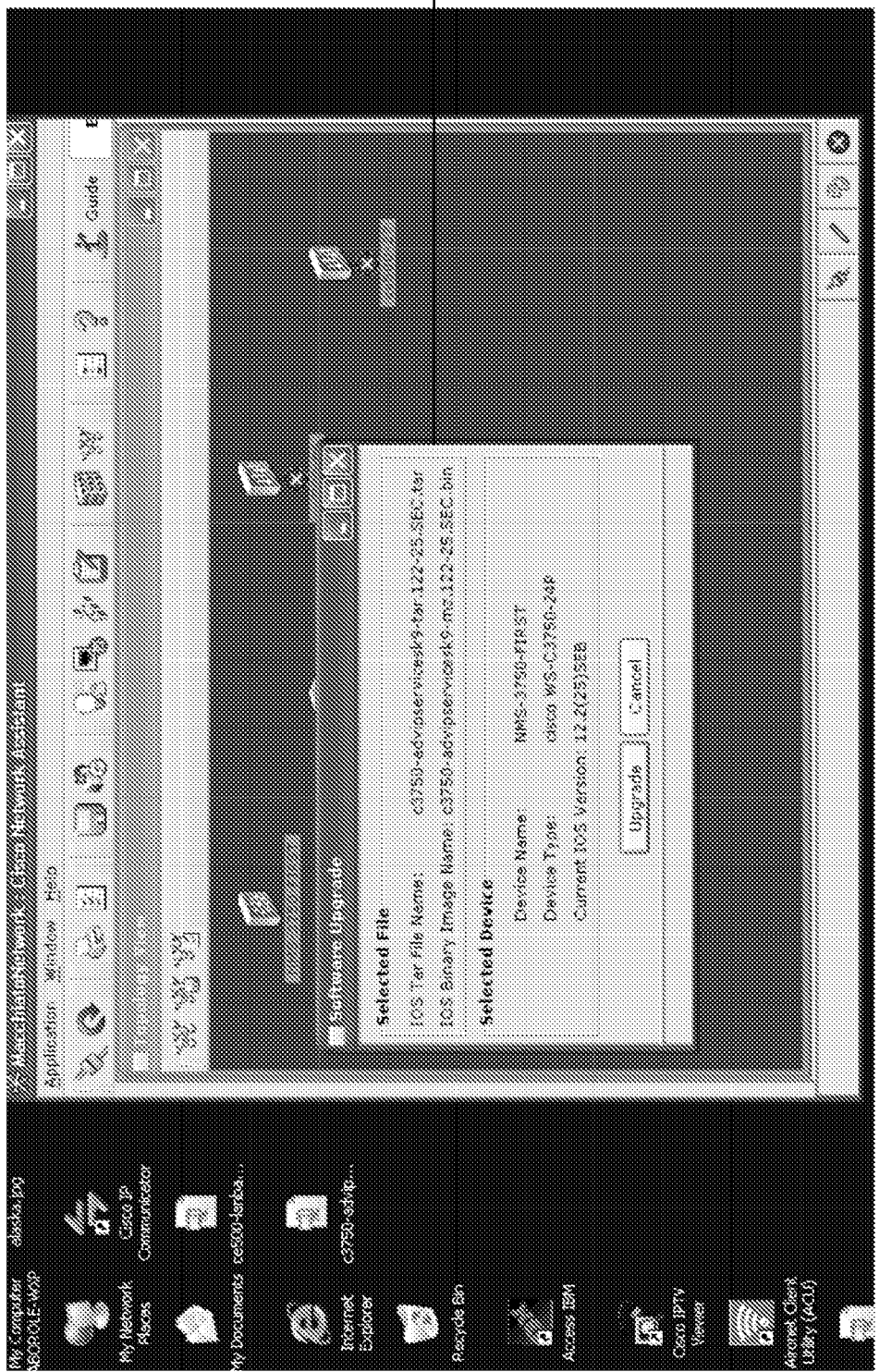
FIG. 19 is an exemplary view illustrating a pop-up for confirmation to upgrade a detected version of the upgrade software, in accordance with various embodiments of the invention.

FIG. 19 is an exemplary view illustrating a pop-up 1902 for confirmation to upgrade the detected version of the upgrade software, in accordance with various embodiments of the invention. Pop-up 1902 provides the information about the selected upgrade software and network device 104 to the user. The user may choose to upgrade the detected version of the upgrade software.

Figure 20:
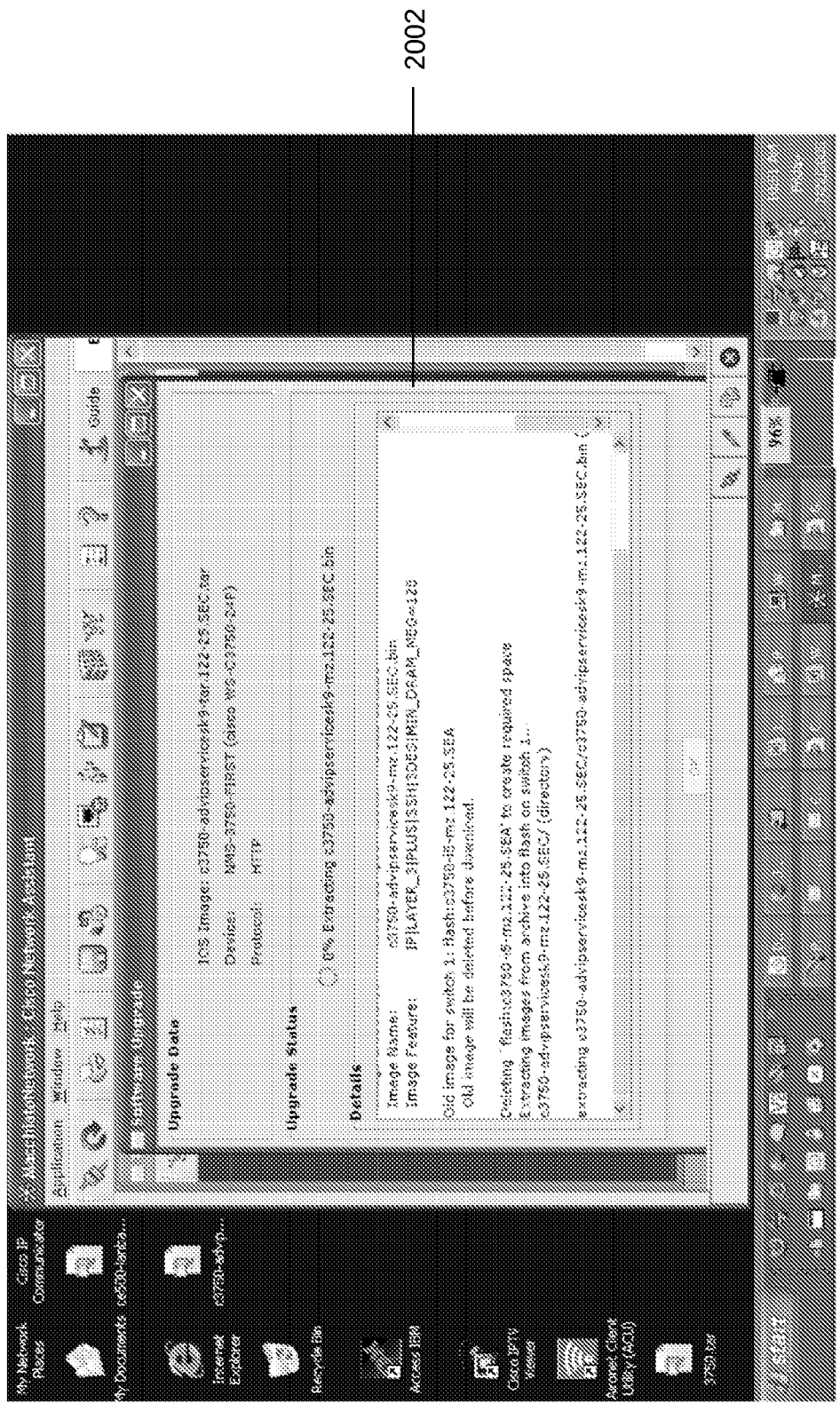
FIG. 20 is an exemplary view illustrating a pop-up for displaying the status of the process of upgrading, in accordance with various embodiments of the invention.

Once the process of upgrading starts, the status of the process of upgrading of element 202 can be displayed to the user. FIG. 20 is an exemplary view illustrating a pop-up 2002 for displaying the status of the process of upgrading, in accordance with various embodiments of the invention. In accordance with various embodiments of the invention, pop-up 2002 displays percentage completion of the process of upgrading.

Figure 21:
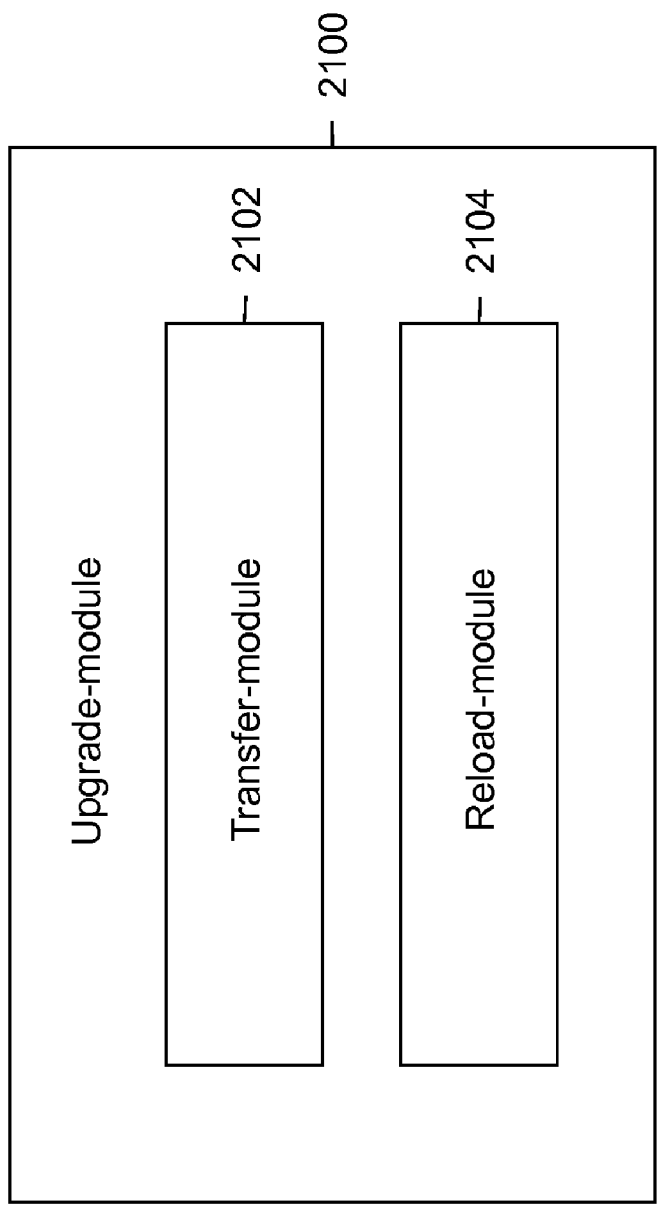
FIG. 21 is a block diagram illustrating an upgrade-module, in accordance with an embodiment of the invention.

In accordance with various embodiments of the invention, an upgrade module is used for the purpose of upgrading. FIG. 21 is a block diagram illustrating an upgrade-module 2100, in accordance with an embodiment of the invention. In an embodiment of the invention, upgrade-module 2100 is included in network device 104. Upgrade-module 2100 includes a transfer-module 2102 and a reload-module 2104. Transfer module 2102 refers to the generated identifier, storing the path of the downloaded selected upgrade software. Transfer-module 2102 then transfers the downloaded selected upgrade software from NMS workstation 206 to network device 104 using the stored file-path. The downloaded selected upgrade software can be transferred to network device 104 using various protocols, such as HTTP, HTTP secure (HTTPS), File Transfer Protocol (FTP), TFTP or embedded TFTP. Transfer-module 2102 also uses the IP address of network device 104 based on the discovered topology of network 100. Therefore, for the process of upgrading, the user is not required to provide either the file-path of the selected upgrade software or the IP address of network device 104, which are automatically detected.

Figure 22:
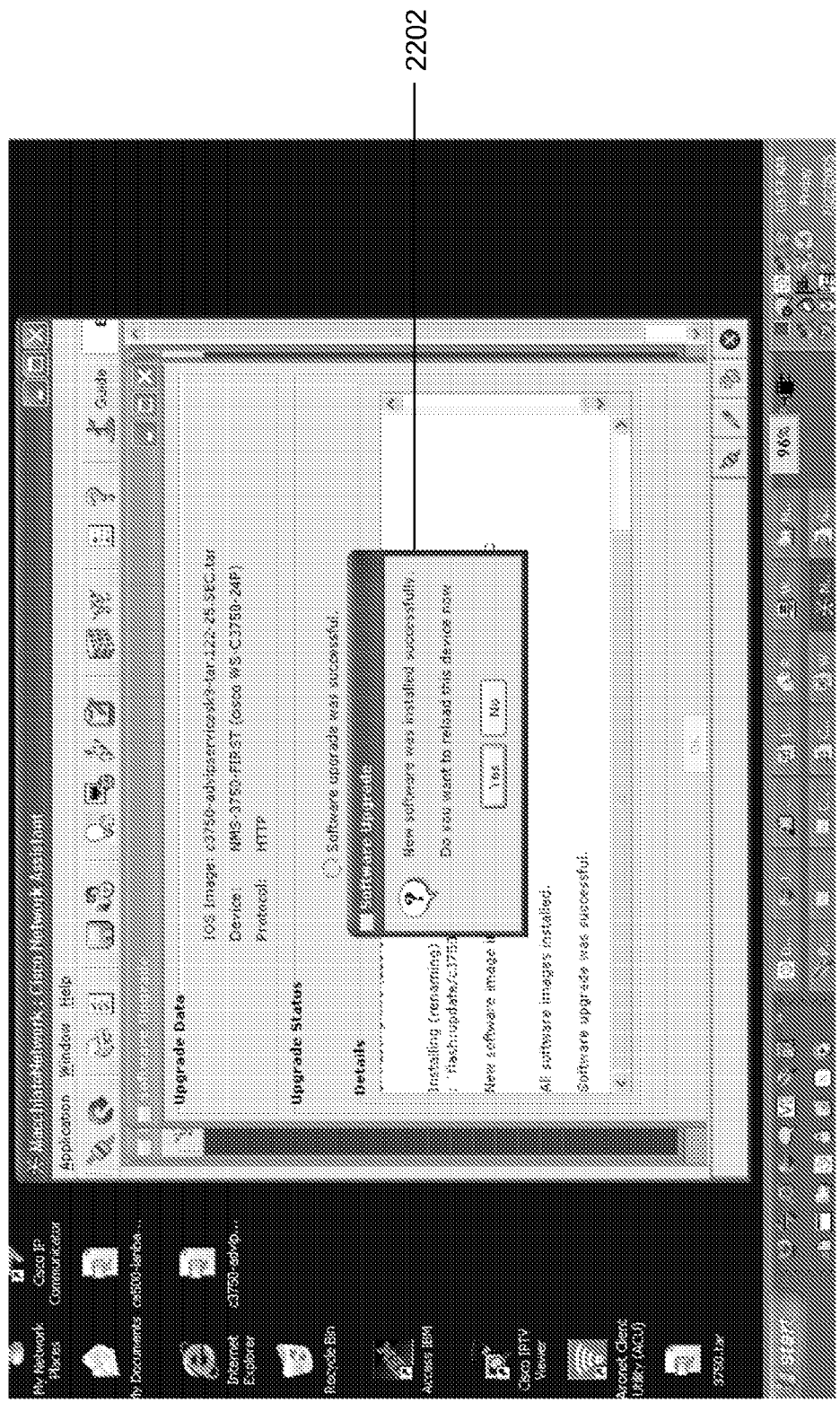
FIG. 22 is an exemplary view illustrating a pop-up for confirmation to reload the device, in accordance with various embodiments of the invention.

Further, reload-module 2104 checks if the selected upgrade software is successfully transferred to network device 104. In case the transfer is complete, reload-module 2104 prompts the user to reload network device 104. Once network device 104 is reloaded, the process of upgrading element 202 on network device 104 is complete. FIG. 22 is an exemplary view illustrating a pop-up 2202 for confirmation to reload network device 104, in accordance with various embodiments of the invention.

In accordance with various embodiments of the invention, a system for upgrading element 202 includes a means for displaying information related to upgrading, means for initiating the process for upgrading element 202, and means for performing a set of checks. The means for displaying is included in NMS workstation 206. The means for initiating the process for upgrading element 202, initiates the process for upgrading when a user drags and drops the first icon onto the second icon. The means for performing the set of checks includes a means for checking if the selected upgrade software is compatible with network device 104.

Various embodiments of the invention provide a GUI for upgrading element 202 using the drag and drop mechanism. The GUI includes a display, displaying a certification-status of the upgrade software assigned by source 204, at least one option related to the process of upgrading, a network topology view, and an upgrade status. The options related to the process of upgrading include options for device identification techniques. The network topology view includes icons representing network devices 102 included in network 100. Further, the upgrade status provides the status of the process of upgrading element 202. The GUI enables initiating the process of upgrading element 202. The process of upgrading element 202 is initiated by dragging and dropping the first icon onto the second icon.

Various embodiments of the invention provide a user-friendly GUI for the process of upgrading the software or firmware. Further, various embodiments of the invention simplify the workflow of the process of upgrading the software or firmware. Accordingly, the user is not required to provide details needed during the process of upgrading. For example, the user is not required to provide the IP addresses of NMS workstation 206, source 204 or network device 104. Further, the user is not required to provide the file-path of the selected upgrade software. The simplified workflow enables the user to initiate the process of upgrading by simply dragging the first icon and dropping it onto the second icon. The first icon may be an icon representing an upgrade software and the second icon may be an icon representing network device 104. Alternatively, the first icon may be an icon representing network device 104 and the second icon may be an icon representing the upgrade software.

Various embodiments of the invention provide automatic configuration of the necessary attributes required during the process of upgrading. For example, during the process of upgrading, when the upgrade software is transferred to network device 104, the user is not required to provide the parameters such as IP address of network device 104 and the file-path of the upgrade software. Such parameters are automatically configured with the help of the identifier. Various embodiments also offer the user a choice to select from multiple ways of automatically discovering the topology of network 100.

Various embodiments of the invention make the process of upgrading robust, as multiple checks are performed during various stages of the process of upgrading. The upgrade software is screened and its compatibility with network device 104 is checked. Therefore, the user does not need to manually check if the selected upgrade software is compatible with network device 104.

Although the invention has been discussed with respect to specific embodiments thereof, these embodiments are merely illustrative, and not restrictive, of the invention.

Any suitable programming language can be used to implement the routines of the various embodiments of the invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments of the invention, multiple steps shown as sequential in this specification can be performed at the same time. The sequence of operations described herein can be interrupted, suspended, or otherwise controlled by another process. The routines can operate in a networking environment or as stand-alone routines occupying all, or a substantial part, of the system processing.

Reference throughout this specification to "one embodiment", "an embodiment", or "a specific embodiment" means that a particular feature, structure, or characteristic described in connection with the embodiment is included in at least one embodiment of the various embodiments of the invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the invention may be combined in any suitable manner with one or more other embodiments. It is to be understood that other variations and modifications of the embodiments of the invention described and illustrated herein are possible in light of the teachings herein and are to be considered as part of the spirit and scope of the invention.

The foregoing description of illustrated embodiments of the invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for downloading upgrade software for upgrading a network device, the method comprising:
    determining a source location acting as a repository for a plurality of upgrade software;
    establishing a network connection between the source location and a network management system (NMS) workstation that is associated with a destination for downloading the upgrade software;
    selecting at least one upgrade software from amongst the plurality of upgrade software available at the source location;
    selecting at least one memory system associated with the NMS workstation as a destination for saving the upgrade software;
    initiating download of the selected upgrade software from the source location to the selected memory system associated with the NMS workstation;
    determining whether the download of the selected upgrade software from the source location to the selected memory system associated with the NMS workstation is complete;
    based on determining that the download of the selected upgrade software is complete:
        prompting a user of the NMS workstation to restart the NMS workstation;
        determining a user input in response to prompting the user to restart the NMS workstation; and
        responsive to determining that the user has selected to restart the NMS workstation, restarting the NMS workstation; and
    based on determining that the download of the selected upgrade software is not complete, aborting the downloading of the selected upgrade software.

2. The method of claim 1, wherein initiating download of the selected upgrade software further comprises downloading information associated with the selected upgrade software, wherein the information includes at least one of a type and a version of the selected upgrade software.

3. The method of claim 1, wherein aborting the downloading of the selected upgrade software further comprises displaying to the user details of errors associated with the download not being completed.

4. The method of claim 1, wherein determining that the download of the selected upgrade software is not complete further comprises determining that a part of the selected upgrade software is missing at the source location.

5. A method for upgrading an element on a network device in a network, the method comprising:
   displaying, on a display associated with a network management system (NMS) workstation, a first icon and a second icon, wherein the first icon represents a network device having an element with a software that is to be upgraded and the second icon represents an upgraded version of the software that is present on the NMS workstation;
   receiving information on the NMS workstation for a user selection of the second icon on the display;
   receiving information on the NMS workstation that indicates a user dragging the second icon on the display;
   receiving information on the NMS workstation for the user dropping the second icon onto the first icon to initiate upgrading of the software for the element in the network device represented by the first icon;
   responsive to receiving the information for the user dropping the second icon onto the first icon, determining, by the NMS and without intervention by the user of the NMS workstation, whether the upgraded version of the software is certified;
   based upon determining that the upgraded version of the software is certified, prompting the user for confirmation to proceed with upgrading the software of the element in the network device;
   responsive to receiving a first confirmation from the user, prompting the user for a second confirmation that the user has correctly chosen the network device for upgrading the software of the element; and
   responsive to receiving the second confirmation from the user, transferring, without intervention by the user, the upgraded version of the software from the NMS workstation to the network device to upgrade the software of the element.

6. The method of claim 5, wherein transferring the upgraded version of the software from the NMS workstation to the network device further comprises transferring the upgraded version of the software using Hyper Text Transfer Protocol (HTTP).

7. The method of claim 5, wherein transferring the upgraded version of the software from the NMS workstation to the network device further comprises transferring the upgraded version of the software using Trivial File Transfer Protocol (TFTP).

8. The method of claim 5, further comprising:
   identifying an Internet Protocol (IP) address associated with an interface of the NMS workstation using which a connection is established with the network device, wherein identifying the IP address associated with the interface of the NMS workstation includes:
     determining, using the NMS, a list of IP addresses associated with all interfaces of the NMS workstation;
     for each IP address in the list of IP addresses, issuing a command to the network device to initiate a fake TFTP request from the network device to the NMS workstation using the IP address;
     receiving, using one interface of the NMS workstation, a first fake TFTP request from amongst a plurality of TFTP requests generated by the network device; and
     identifying an IP address associated with the one interface of the NMS workstation as the IP address associated with the interface of the NMS workstation using which the connection is established with the network device.

9. The method of claim 5, wherein displaying on the display of the NMS workstation further comprises displaying a graphical user interface (GUI).

10. A method for displaying a topology of a network associated with a network management system (NMS), the method comprising:
    presenting to a user of an NMS and on a workstation display associated with the NMS, a plurality of options for device identification techniques for identifying network devices in a network associated with the NMS, wherein the plurality of options includes at least one selected from a group including an auto-detection technique, a clustering technique and a community technique;
    prompting the user to make a selection from the plurality of options;
    responsive to receiving an indication of the user making a selection, determining whether the user selected the auto-detection technique;
    based on determining that the user has selected the auto-detection technique, enabling the auto-detection technique;
    based on determining that the user has not selected the auto-detection technique, disabling the auto-detection technique and determining whether the user has selected the clustering technique;
    based on determining that the user has selected the clustering technique, enabling the clustering technique;
    based on determining that the user has not selected the clustering technique, disabling the clustering technique and enabling the community technique;
    discovering a topology of the network using an enabled device identification technique; and
    displaying, using the workstation display, a view of the topology of the network by providing a representation of the discovered topology of the network.

11. The method of claim 10, wherein enabling the auto-detection technique and discovering the topology of the network further comprises:
    based on enabling the auto-detection technique, enabling a plurality of auto-smartports in the network, wherein an auto-smartport is configured to monitor and detect new network devices connected to the auto-smartport;
    monitoring the enabled plurality of auto-smartports;
    detecting a network device when the network device is connected to at least one of the enabled auto-smartport; and
    prompting the user to upgrade the detected network device using an upgrade software when the upgrade software is available on the NMS workstation.

12. The method of claim 10, wherein enabling the clustering technique and discovering the topology of the network further comprises:
    responsive to enabling the clustering technique, enabling a clustering module that is included in the workstation;

displaying to the user, using the clustering module, a list of switches included within network devices in the network;

receiving an indication of the user selecting a plurality of switches for including in a plurality of clusters;

forming a plurality of clusters based on the plurality of switches selected by the user;

assigning an IP address to each of the plurality of clusters, wherein the IP address for each of the plurality of clusters is assigned based on user selection; and for each of the plurality of clusters, identifying at least one network device that is supported by the each of the plurality of clusters.

13. The method of claim 10, wherein enabling the community technique and discovering the topology of the network further comprises:

responsive to enabling the community technique, enabling a community module that is included in the workstation;

assigning, using the community module, IP addresses to a plurality of networking devices in the network;

establishing communications channels between the plurality of networking devices to which IP addresses are assigned using the community module; and for the plurality of networking devices to which IP addresses are assigned, identifying network devices that are supported by each networking device in the plurality of networking devices to which IP addresses are assigned using the community module.

14. A network device for upgrading a software in the network device with an upgraded version of the software that is transferred from a network management system (NMS), the network device including:

a processor; and a transfer module including one or more instructions encoded in non-transitory machine-readable medium for execution by the processor, the instructions being configured to cause the processor to:

determine, from an identifier generated by a network management system (NMS), information indicating a location of an upgraded version of software at the NMS;

store the determined information indicating the location of the upgraded version of the software at the NMS; and transfer, using the stored information, the upgraded version of the software from the location at the NMS to a network device; and a reload module configured to include one or more instructions encoded in non-transitory machine-readable medium for execution by the processor, the instructions being configured to cause the processor to:

determine whether the upgraded version of the software is completely transferred to the network device using the transfer module; and based on determining that the upgraded version of the software is completely transferred to the network device, prompt, using an indicator to present on a display associated with the NMS, a user of the NMS to reload the upgraded version of the software on the network device.

15. The network device of claim 14, wherein the one or more instructions included in the transfer module are further configured to cause the processor to transfer the upgraded version of the software from the location at the NMS to the network device using a protocol selected from a group including HTTP, secure HTTP (HTTPS), File Transfer Protocol (FTP), TFTP and embedded TFTP.

16. A system for downloading upgrade software for upgrading a network device, the system comprising:

a processor; and one or more instructions encoded in non-transitory machine-readable medium for execution by the processor, and when executed cause the processor to perform operations including:

determining a source location acting as a repository for a plurality of upgrade software;

establishing a network connection between the source location and a network management system (NMS) workstation that is associated with a destination for downloading the upgrade software;

selecting at least one upgrade software from amongst the plurality of upgrade software available at the source location;

selecting at least one memory system associated with the NMS workstation as a destination for saving the upgrade software;

initiating download of the selected upgrade software from the source location to the selected memory system associated with the NMS workstation;

determining whether the download of the selected upgrade software from the source location to the selected memory system associated with the NMS workstation is complete;

based on determining that the download of the selected upgrade software is complete:

prompting a user of the NMS workstation to restart the NMS workstation;

determining a user input in response to prompting the user to restart the NMS workstation; and responsive to determining that the user has selected to restart the NMS workstation, restarting the NMS workstation; and based on determining that the download of the selected upgrade software is not complete, aborting the downloading of the selected upgrade software.

17. A system for upgrading an element on a network device in a network, the system comprising:

a processor; and one or more instructions encoded in non-transitory machine-readable medium for execution by the processor, and when executed cause the processor to perform operations including:

displaying, on a display associated with a network management system (NMS) workstation, a first icon and a second icon, wherein the first icon represents a network device having an element with a software that is to be upgraded and the second icon represents an upgraded version of the software that is present on the NMS workstation;

receiving information on the NMS workstation for a user selection of the second icon on the display;

receiving information on the NMS workstation that indicates a user dragging the second icon on the display;

receiving information on the NMS workstation for the user dropping the second icon onto the first icon to initiate upgrading of the software for the element in the network device represented by the first icon;

responsive to receiving the information for the user dropping the second icon onto the first icon, determining, by the NMS and without intervention by the user of the NMS workstation, whether the upgraded version of the software is certified;

based upon determining that the upgraded version of the software is certified, prompting the user for confirmation to proceed with upgrading the software of the element in the network device;

responsive to receiving a first confirmation from the user, prompting the user for a second confirmation that the user has correctly chosen the network device for upgrading the software of the element; and responsive to receiving the second confirmation from the user, transferring, without intervention by the user, the upgraded version of the software from the NMS workstation to the network device to upgrade the software of the element.

18. A system for displaying a topology of a network associated with a network management system (NMS), the system comprising:

a processor; and one or more instructions encoded in non-transitory machine-readable medium for execution by the processor, and when executed cause the processor to perform operations including:

presenting to a user of an NMS and on a workstation display associated with the NMS, a plurality of options for device identification techniques for identifying network devices in a network associated with the NMS, wherein the plurality of options includes at least one selected from a group including an auto-detection technique, a clustering technique and a community technique;

prompting the user to make a selection from the plurality of options;

responsive to receiving an indication of the user making a selection, determining whether the user selected the auto-detection technique;

based on determining that the user has selected the auto-detection technique, enabling the auto-detection technique;

based on determining that the user has not selected the auto-detection technique, disabling the auto-detection technique and determining whether the user has selected the clustering technique;

based on determining that the user has selected the clustering technique, enabling the clustering technique;

based on determining that the user has not selected the clustering technique, disabling the clustering technique and enabling the community technique;

discovering a topology of the network using an enabled device identification technique; and displaying, using the workstation display, a view of the topology of the network by providing a representation of the discovered topology of the network.

* * * * *